(12) United States Patent
Klein et al.

(10) Patent No.: US 6,339,772 B1
(45) Date of Patent: Jan. 15, 2002

(54) SYSTEM AND METHOD FOR PERFORMING DATABASE OPERATIONS ON A CONTINUOUS STREAM OF TUPLES

(75) Inventors: Johannes Klein, San Francisco; Robbert C. Van der Linden, Scotts Valley; Raj K. Rathee, Santa Clara; Hansjorg Zeller, Los Altos, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/347,997

(22) Filed: Jul. 6, 1999

(51) Int. Cl.[7] .............................................. G06F 17/30
(52) U.S. Cl. ................................. 707/4; 707/3; 707/5
(58) Field of Search .............................. 707/10, 1, 202, 707/102, 101; 710/200

(56) References Cited

U.S. PATENT DOCUMENTS

| | | | | | |
|---|---|---|---|---|---|
| 5,276,872 A | * | 1/1994 | Lomet et al. | ................ | 395/600 |
| 5,440,732 A | * | 8/1995 | Lomet et al. | ................ | 395/600 |
| 5,485,607 A | * | 1/1996 | Lomet et al. | ................ | 395/600 |
| 5,504,899 A | * | 4/1996 | Raz | ........................... | 395/650 |
| 5,551,027 A | * | 8/1996 | Choy et al. | ................. | 395/600 |
| 5,682,537 A | * | 10/1997 | Davies et al. | ................ | 395/726 |
| 5,845,292 A | * | 12/1998 | Bohannon et al. | .......... | 707/202 |
| 5,960,194 A | * | 9/1999 | Choy et al. | ................. | 395/613 |

* cited by examiner

Primary Examiner—Hosain T. Alam
Assistant Examiner—Tam Nguyen
(74) Attorney, Agent, or Firm—Pennie & Edmonds LLP

(57) ABSTRACT

The SQL compiler and SQL executor in a database management system are extended to process queries requiring streaming mode processing of data stored in a table. A scan operator performs table access functions during execution of the streaming mode query. The scan operator first performs an initial scan to access rows in a specified database table, and then performs a delta scan to access new rows added to the table, as well as rows modified by other queries. The scan operator continues to process new data added to the table until the initiating user or application closes the associated cursor. A set of data structures are provided to keep track of active scan operators, including a session control block that includes fields for keeping track of whether the scan operator is performing an initial scan or a delta scan. The session control block also includes, for streaming mode scan operators, a delta scan list of new and modified rows to be processed in the delta scan. When a transaction terminates, any streaming mode scan operators whose operation was suspended because of rows locked by the transaction are automatically rescheduled for execution.

36 Claims, 14 Drawing Sheets

Application Execution
Time Line

| Start Transaction (obtain TX ID: TxID1)

Open Cursor (Compile and begin execution of SQL statement)
    Fetch (retrieve data from table, using open cursor)
    Process fetched data
    Fetch
    Process fetched data
    ...

End Transaction (Commit TxID1)

Disk Process commits database changes, if any, made by TxID1

Start Transaction (obtain TX ID: TxID2)
    Fetch (retrieve data from table, using open cursor)
    Process fetched data
    Fetch
    Process fetched data
    ...

End Transaction (Commit TxID2)

Disk Process commits database changes, if any, made by TxID1

... (Additional processing: more transactions, etc.)

Close cursor (terminates execution of compiled SQL statement)
▼

Fig. 5

SYSTEM AND METHOD FOR PERFORMING DATABASE OPERATIONS ON A CONTINUOUS STREAM OF TUPLES

RELATED APPLICATIONS

This application is related to the following applications: "Database Management System and Method For Accessing Rows in a Partitioned Table," Ser. No. 09/347,998; "Database Management System And Method For Dequeuing Rows Published to a Database Table," Ser. No. 09/347,996; "System And Method For Performing Database Operations and for Skipping over Tuples Locked in an Incompatible Mode," Ser. No. 09/347,995; and "Database Management System and Method For Updating Specified Tuple Fields Upon Transaction Rollback," Ser. No. 09/347,994, all filed Jul. 6, 1999.

FIELD OF INVENTION

The present invention relates generally to a relational database system that has been extended to perform operations on a continuous stream of tuples, and particularly to a system and method for optimizing such operations and minimizing the impact of such those operations on other operations being performed by the same system.

BACKGROUND OF THE INVENTION

Traditional relational database systems receive commands falling into two categories: data definition commands (DDL) and data manipulation commands (DML). Data manipulation commands can be categorized as either queries that read data in the database or update statements that insert, delete or update data in the database base. Traditional database systems are designed and optimized for those operations. These systems are not designed and optimized for allowing applications to register to receive notifications when new data becomes available or existing data is updated.

However, receiving such notifications is essential for many applications. The need for such services has caused most transaction service vendors to extend their systems by including separate, special purpose resource managers for queue management and publish/subscribe services. These resource managers allow applications to enqueue and dequeue requests for information. Publish/subscribe services allow applications to publish and subscribe to notifications. In such systems, transactions access both an SQL database system (which may be considered to be a type of resource manager) as well as resource managers for queuing and/or publish/subscribe services. As a result, the SQL database system and the other resource managers have to participate together in an expensive two-phase commit protocol. Due to the lack of integration between the resource managers and the database system, the SQL compiler cannot optimize access to both the data stored by the queuing or publish/subscribe resource manager and the data stored in the database, and cannot perform joins across the different data sources.

To avoid subjecting applications to the two-phase commit protocol, some SQL database vendors (e.g., Oracle and Sybase) have integrated transactional queuing and publish/subscribe services into their database products. While their implementations remove the need for a two-phase commit protocol, these implementations use special purpose objects for queues and publication channels. These implementations prevent queues and publication channels from being accessed as part of SQL statements, unless the user is willing to forgo important characteristic properties of queue or notification channels, particularly suspending execution when all qualifying tuples have been returned and automatically resuming execution when new tuples become available. It also effectively prevents the SQL compiler in these systems from optimizing access to notifications and SQL data.

The present invention provides transactional queuing and publish/subscribe extensions to an SQL database infrastructure. These extensions do not introduce any special objects. Applications access regular SQL database tables, including tables used as queues or publication channels. Applications use SQL select statements to subscribe and/or dequeue notifications. Furthermore, applications use SQL insert and update statements to publish notifications. These extensions remove the need for a two-phase commit protocol, allow applications to perform join operations on data from different sources, and allow the SQL compiler to optimize access to both notifications and "normal" SQL data, using previously developed query optimization techniques. Further, execution of an SQL statement that accesses a data stream is blocked when all qualifying tuples have been processed and then resumes once new notifications become available.

As indicated above, the present invention extends traditional relational database systems to perform operations on a continuous stream of tuples, while retaining the traditional benefits of such systems, such as set oriented access using relational operators, transactional protection, and so on. The stream of tuples may represent queue entries, or notifications.

A simple example will assist in understanding the difference between traditional and streaming queries. A traditional query for viewing or otherwise processing records relating to sales by a particular salesperson might be:

select*from SalesInfo where salesperson="Johnson, Mary".

This query would retrieve all records from the table named "SalesInfo" having a value of "Johnson, Mary" in the salesperson field (column). Only records in the table at the time the query is submitted will be reported by this query.

However, if the user wants the system to continuously monitor new sales entries for a particular salesperson, the user of a traditional relational database system cannot define a simple SQL statement to perform that function, since monitoring features are not an integrated part of any of the widely used "dialects" of SQL. In contrast to that, the present invention allows users to issue an SQL select statement that performs this function:

select * from stream(SalesInfo) where salesperson="Johnson, Mary";

Using the present invention, when an SQL statement specifies stream access, the execution of the SQL statement never returns an "end of data" indicator. Rather, when all qualifying tuples in the specified table have been processed, continued execution is blocked, and then resumes when more qualifying tuples become available.

SUMMARY OF THE INVENTION

The SQL compiler and SQL executor of a relational database system are extended to process operations on streams of tuples and to access regular database tables as continuous streams of tuples. In particular, a new table access method provides "stream access" to a specified table.

When using stream access, the SQL executor first reads all qualifying tuples in a specified table, and subsequently monitors for and returns new qualifying tuples being added to the table. The first part of the method is performed by a regular table scan, while the second part of the method is performed by a so-called delta scan. The monitoring function is performed until the cursor representing the SQL statement being executed, including the scan operations, is closed by the calling application.

The stream access mode of operation causes execution of an SQL statement to block, and thus be suspended, when there are no qualifying tuples to be returned to the calling application. Execution of the SQL statement automatically resumes (actually, is rescheduled) when new data becomes available.

A set of data structures are provided to keep track of active table access operators associated with active statements (whose execution has not yet terminated). The data structures keep track of the status of each active table access (scan) operator. In particular, a session control block is expanded to include fields for keeping track of whether a scan is in the initial "regular" scan phase, or is in the delta scan phase of a scan operation. The session control block also includes a "delta scan list" of new and modified rows to be processed in the delta scan phase. When any transaction terminates, and the terminated transaction updated the delta scan list, the delta scan operation is automatically rescheduled for execution to process the rows in the delta scan list that were added or modified by the terminated transaction.

Another feature of the present invention is a "skip conflict" access mode of operation. Normally, a table access operator is blocked when it attempts to access a row that is locked in a conflicting mode, such as a write lock mode, which is inconsistent with the read or write access required by the table access operator. Generally, the lock in the conflicting mode will be held by a transaction other than the transaction associated with the operator in question. When the SQL statement being executed uses the new "skip conflict" syntax provided by the present invention, the operator skips over rows that are locked in a conflicting mode, which would otherwise cause the operator to suspend operation. Furthermore, if the operator is operating in streaming mode, a key that identifies such skipped rows is added to the operator's list of rows to be processed during the delta scan phase.

Another feature of the present invention is an execution engine for executing select statements that have an embedded delete or update operation. A select statement with an embedded delete operation is used by applications to dequeue data from a table. A dequeue statement in an application program is converted into a select statement (query) that uses the stream, skip conflict and embedded delete features of the present invention. A select statement with an embedded update operation enables an application to have the database management system modify rows in a table before the rows are returned to the application, as a single integrated operation.

Another feature of the present invention is the use of a fan out operator and a set of partition scan operators in an execution engine to access a table that has been partitioned. When the table to be accessed by a statement is partitioned, a respective partition scan operator is used to access rows of each respective database table partition. A fan out operator receives requests from a calling application to access rows from a table, and responds by sending requests for rows to the partition scan operators. The fan out operator subsequently receives rows of the table from the partition scan operators and sends the received rows of the database table to another node in the execution tree. Each of the partition scan operators responds to the requests for rows by returning to the fan out operator qualifying rows, if any, from the corresponding table partition. If the statement being executed includes an embedded delete or update operation, the qualifying rows are deleted or updated at the same time that the qualifying rows are retuned to the fan out operator. The transaction associated with the delete or update operation is not allowed to commit until all rows deleted or updated by the partition scan operators have been sent to the calling application. When the statement being executed is a streaming mode query, the fan out operator sends non-blocking requests to the partition scan operators so that when one access to one partition is blocked, rows from another partition are processed.

Yet another feature of the present invention is an execution engine that, upon rollback of an aborted transaction, has the ability to set fields of the rows that are updated or deleted by the transaction prior to aborting. In particular, when a select, update or delete statement includes the "set on rollback" clause, the respective table access operator of the execution engine modifies the "before image" of each row that is stored by the transaction log manager. The modified before image includes the field updates specified by the set on rollback clause. If a transaction associated with the statement aborts, the restored before images are set to include the field updates specified by the set on rollback clause when the transaction log manager restores the before images of each row that was deleted or updated by the transaction.

BRIEF DESCRIPTION OF THE DRAWINGS

Additional objects and features of the invention will be more readily apparent from the following detailed description and appended claims when taken in conjunction with the drawings, in which:

FIG. 5 depicts an application execution time line showing for an application that executes a sequence of distinct transactions during execution of a single query.

DESCRIPTION OF THE PREFERRED EMBODIMENTS

Conventional Relational Database Query Processing

FIGS. 1–5 show aspects of conventional relational database query processing, and conventional transaction processing. These are also applicable to the preferred embodiments of the present invention.

Figure 1:
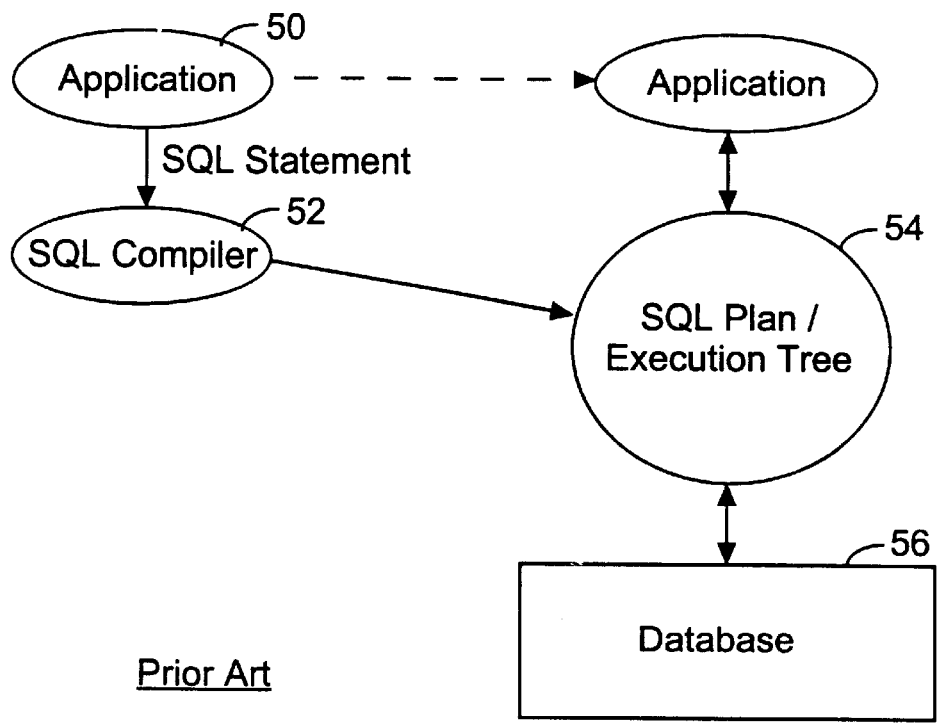
FIG. 1 is a block diagram of a transaction processing system having an SQL compiler.
Figure 2:
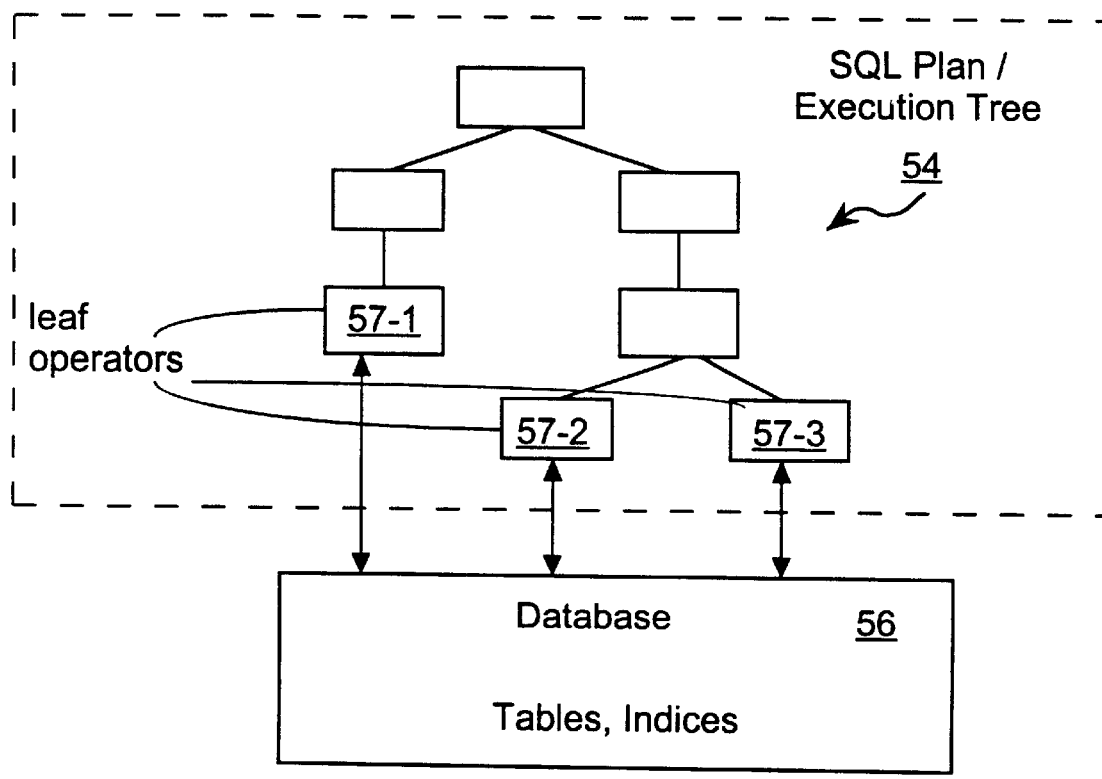
FIG. 2 depicts an execution tree generated by an SQL compiler.

Referring to FIG. 1, in a traditional relational database environment, an application program 50 submits a query to an SQL (structured query language) compiler 52. The SQL compiler converts the query into an SQL plan or execution tree 54 that is executed by an SQL executor (not shown). The compiled SQL plan stores and/or retrieves data from a database 56. As shown in FIG. 2, the leaf nodes 57 of the execution tree are the ones that actually interact with the database 56. Leaf nodes 57 are often called scan operators or table access operators.

In this document, the term "table access operators" will be used to collectively refer to scan operators, which are used to read data from tables, as well as update, delete and insert operators, which are used to modify the contents of tables. However, sometimes the term "scan operator" will be used synonymously with "table access operator." Many of the same control structures and system control procedures that are applicable to scan operators are also applicable to other types of table access operators.

Figure 3:
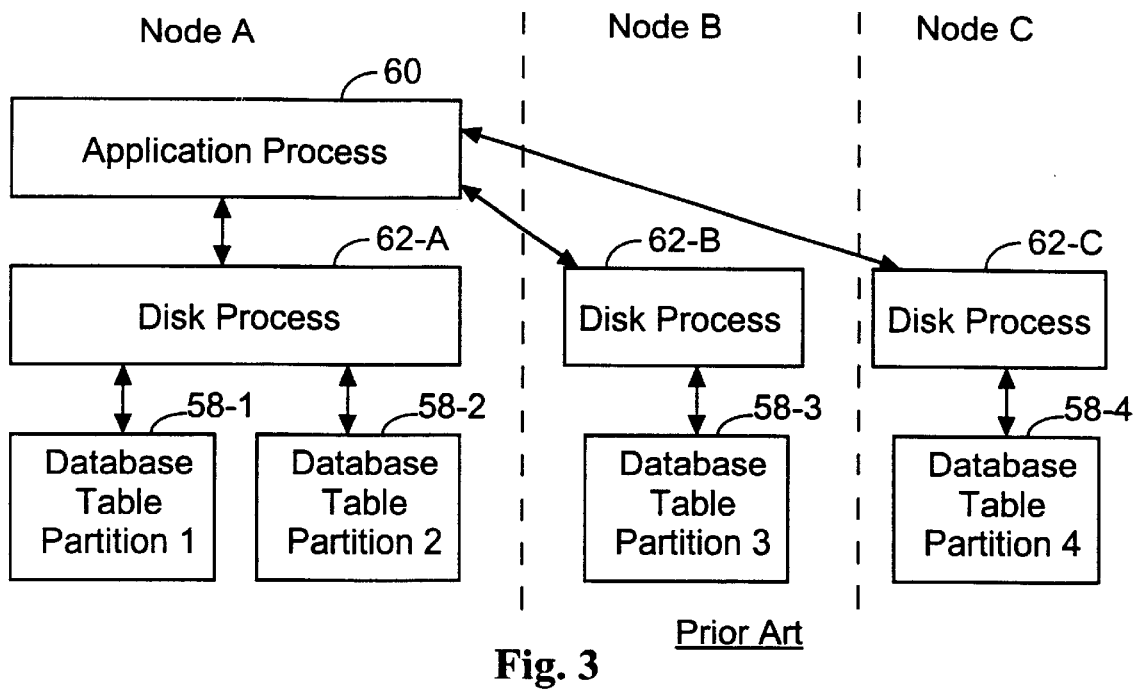
FIG. 3 depicts a system in which a database table is partitioned and stored on multiple nodes of the system.

Referring to FIG. 3, tables in the database 56 may be partitioned, with various partitions 58 being stored on different nodes of the relational database system. Such partitioning is often used for extremely large tables. Also, various tables within a database may be stored on different nodes of the system. Such distributed storage facilitates efficient, parallel processing of queries, by distributing both the disk I/O and computational burden over multiple nodes. In FIG. 3, the "application process" 60 represents the process or processes that execute not only the application program, but also the portions of the execution tree 54 above the leaf nodes. The leaf nodes are executed by disk processes 62 in each of the nodes of the transaction processing system. While FIG. 3 shows one disk process 62 for each node, the number of disk processes per node may vary from one implementation to another. For instance, a separate disk process may be used for each logical disk volume.

Figure 4:
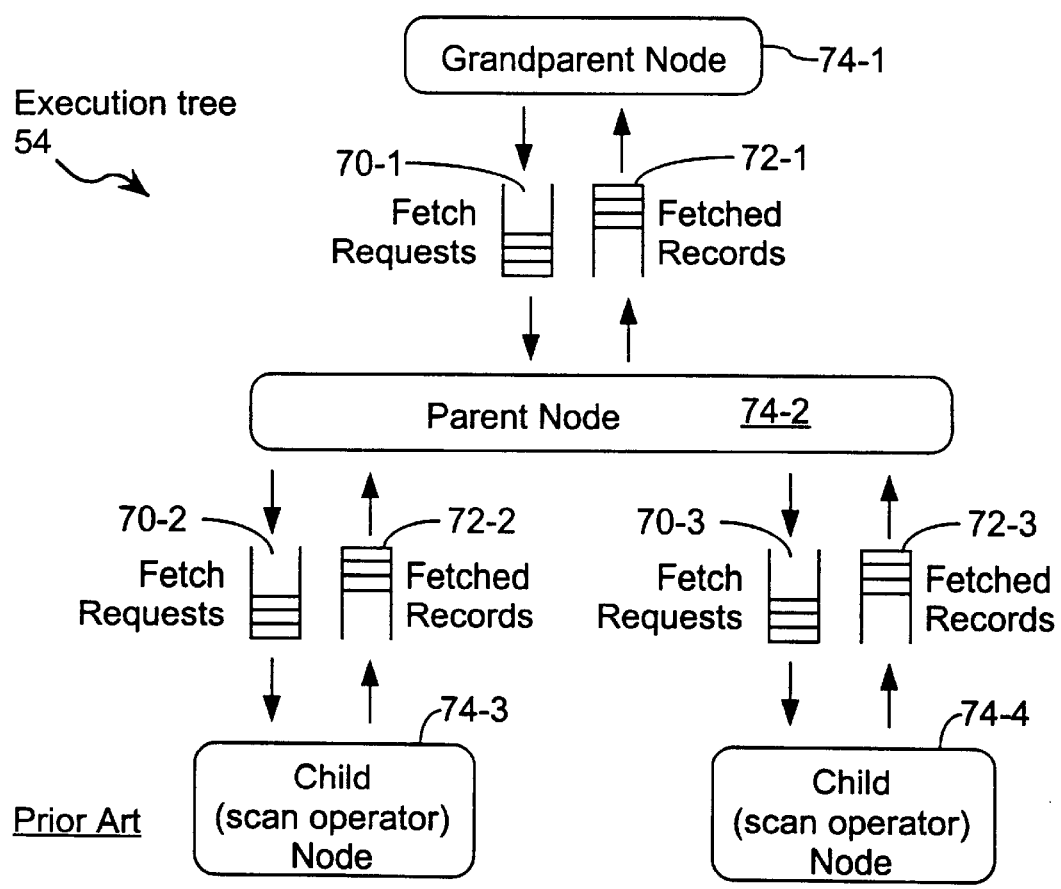
FIG. 4 depicts request and response queues, also known as pre-fetch buffers, between tasks or operators in a query execution tree.

Referring to FIGS. 2 and 4, data flows between the nodes of the execution tree 54 may be handled by the use of a pair of queues 70, 72 between parent and child nodes 74. In particular each parent node (e.g., 74-1) is coupled to a child node (e.g., 74-2) by a request queue 70 and a fetched records queue 72. The request queue 70 stores requests being conveyed from the parent node to its child node, while the fetched records queue 72 conveys data and return codes (e.g., an end of file or end of scan code) being returned to the parent node in response to the requests.

Referring to FIG. 5, while most aspects of the present invention concern the integration of streaming access into an SQL environment, some aspects of the invention involve transaction processing. Generally, a relational database includes a transaction management subsystem, which provides various services to applications in conjunction with the relational database. While many transactions include the execution of a SQL statement, transactions and SQL statement execution are not the same thing. To help explain the distinction, reference is made to FIG. 5 which shows the execution time line for an exemplary application. As shown, the application starts a first transaction (TxID1), opens a cursor (begins execution of a query), performs one or more fetches using the cursor, and then ends the first transaction. If the first transaction ends by committing the transaction, all changes made to the database by the transaction are made durable and locks to the corresponding tuples that are held by the transaction are released.

In this example the application has not closed the cursor even though the first transaction has ended. Rather, the application starts a second transaction, fetches more data using the open cursor, and then ends the second transaction. Generally, it is possible for an application to execute an unlimited number of transactions using a single open cursor—corresponding to a single query (SQL statement). Thus, query execution and transaction execution are distinct operations that often overlap, but which are logically distinct. From another viewpoint, while many SQL statements are, in fact, executed completely within the context of a single transaction, the transaction and statement execution mechanisms are distinct and allow much more flexible arrangements. In the context of the present invention, when using streaming access to database tables, applications may use a sequence of transactions while executing long running streaming access queries.

Computer System

Figure 6:
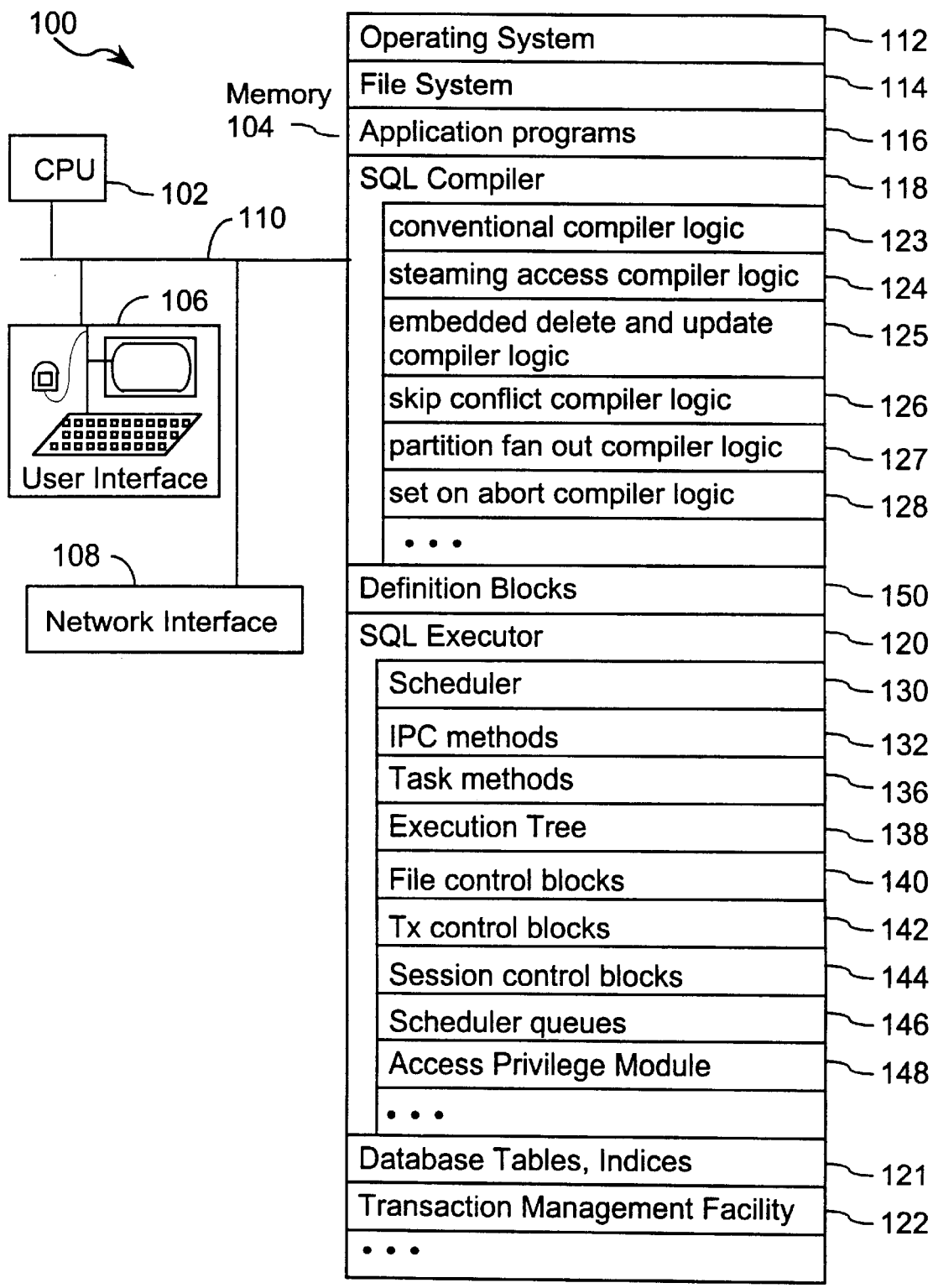
FIG. 6 depicts one node of a transaction processing system.

Before describing the operation of the invention, a computer system 100 in which an embodiment of the invention is implemented will be described with reference to FIG. 6. The computer system 100 includes:

one or more data processing units (CPU's) 102;

memory 104, which will typically include both high speed random access memory as well as non-volatile memory;

a user interface 106;

a network or other communication interface 108 for communicating with other computers; and one or more communication busses 110 for interconnecting the CPU(s) 102, memory 104, user interface 106 and network interface 108.

The computer system's memory 104 stores procedures and data, typically including:

an operating system 112 for providing basic system services;

a file system 114, which may be part of the operating system;

application programs 116, such as programs executed in user address spaces on behalf of users of the system 100;

an SQL compiler 118, for compiling SQL statements (or more generally, database queries), and portions of SQL statements;

an SQL executor 120 for executing SQL statements;

database tables 121, for storing data; and a transaction management facility 122 that manages the execution of transactions.

The SQL compiler 118 may include:

conventional SQL compiler logic 123 for compiling SQL statements using previously defined (conventional) SQL syntax;

streaming access compiler logic 124, which modifies the conventional compiler logic to handle streaming access SQL statements, for example SQL statements using the new extended SQL syntax of the preferred embodiment;

embedded delete and embedded update compiler logic 125 for handling delete and update operations embedded in SQL select statements, for example SQL statements using the new extended SQL syntax of the preferred embodiment;

skip conflict compiler logic 126, which modifies the conventional compiler logic to handle skip conflict access to a table, using either regular or streaming mode access;

partition fan out compiler logic 127, which modifies the conventional compiler logic to handle embedded update and delete operations, for example SQL statements using the new extended SQL syntax of the preferred embodiment, when an update or delete operation is applied to a partitioned table; and set on rollback compiler logic 128, which modifies the conventional compiler logic to handle "set on rollback" operations specified in SQL statements, for example SQL statements using the new extended SQL syntax of the preferred embodiment.

The SQL executor 120, sometimes called the executor, includes:

a scheduler 130 for scheduling the execution of tasks in an execution tree 138 (also called a task tree); the scheduler determines the order and frequency with which the tasks are executed;

a set of interprocess communication methods 132 for handling the communication of requests and replies between tasks that are in different processes (i.e., in different address spaces); the interprocess communication methods may be implemented as part of the operating system 112;

a set of task methods 136, which are the basic functions or procedures that can be performed by each of the tasks in an execution task tree; the present invention adds new tasks to this set of tasks; and an execution tree 138, which may include a number of subtrees that are located in separate processes.

The SQL executor 120 also preferably includes a set of data structures for keeping track of the tasks it is executing, including:

file control blocks 140, including one for each table partition in the database;

transaction control blocks 142, including one for each active transaction;

session control blocks 144, including one for each active scan operator (i.e., leaf node in an execution tree);

various scheduler queues 146 for keeping track of blocked, waiting and active tasks; and an Access Privilege module 148 for controlling access to the various tables in the database.

The access privilege module 148 limits access to information in each table on a user by user basis. Furthermore, some users may be granted read access to tables, but not delete access, while other more privileged or trusted users are also granted delete access. The use of an access privilege module in database systems is well known to those skilled in the art.

Figure 7:
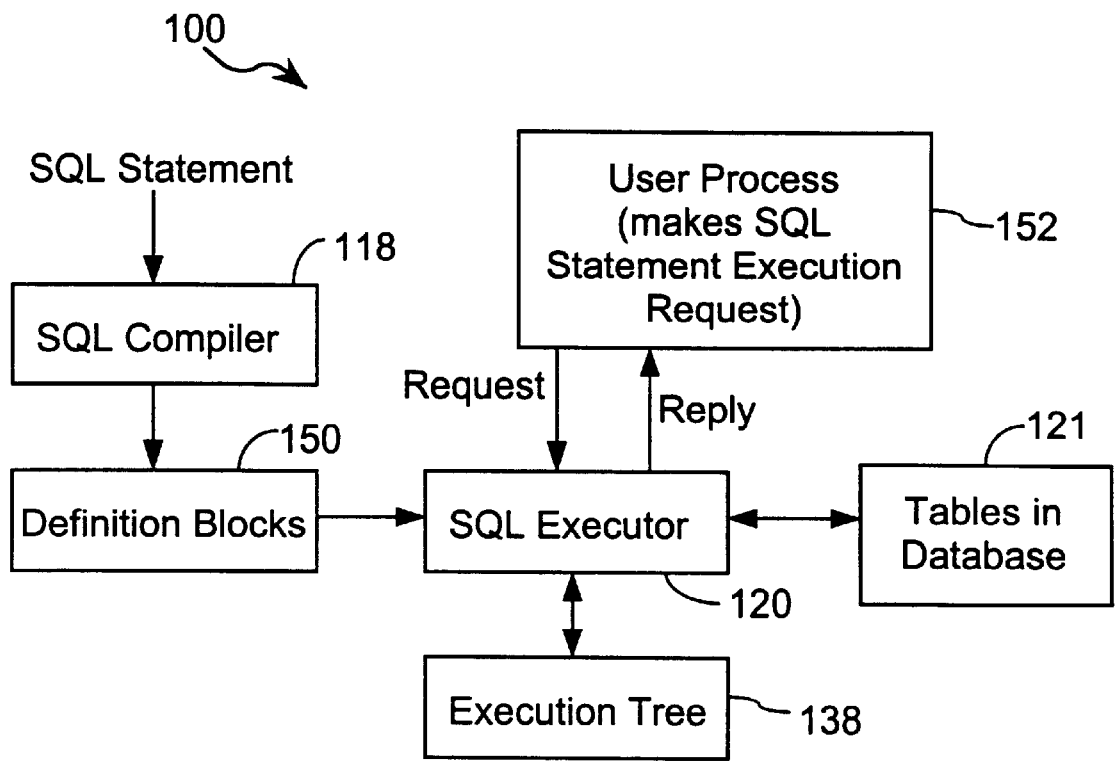
FIG. 7 depicts the relationship between an SQL compiler, SQL executor and a user process.

Referring to FIG. 7, the SQL compiler 118 produces for the SQL executor 120 a set of definition blocks 150 from which the SQL executor 120 can build an execution tree 138. These definition blocks 150 are loaded by the SQL executor 120 and used to create control blocks (170, FIG. 8) arranged into a graph called an execution tree 138. The execution of SQL statements is thereafter accomplished by interpreting these control blocks. In a preferred embodiment, the SQL compiler 118 does not produce any binary machine instruction code; instead it produces definition blocks 150 that the SQL executor 120 interprets.

The execution tree 138 contains all the components necessary for executing an SQL statement, including integrity checks, firing triggers, and the body of an invoked SQL stored procedure.

Figure 8:
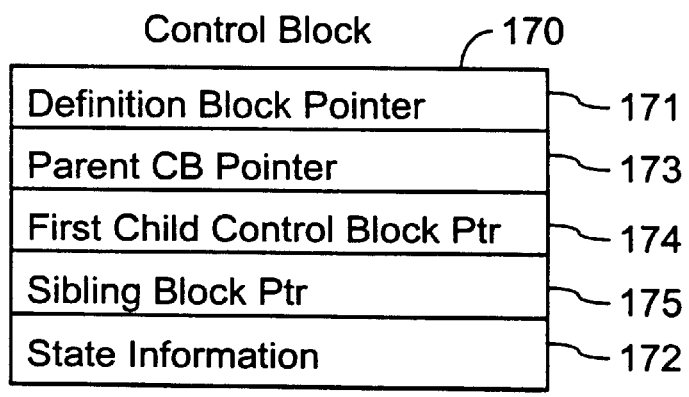
FIG. 8 depicts a control block data structure.

Referring to FIG. 8, each task control block 170 generated by the SQL executor includes a pointer 171 to a definition block 150, state information 172 about computational state of the associated task, and a set of parent 173, child 174 and sibling 175 control block pointers, which are used to form the directed graph or tree structure, an example of which is shown in FIG. 2.

Streaming SQL Query

An example of a streaming SQL query is:

select * from stream (SalesInfo) where salesperson="Johnson, Mary".

The "stream" keyword is used to indicate that the execution of the query is to continue even after the end of the table is reached, i.e., all qualifying tuples have been returned. In particular, when executing this query the SQL executor first processes all the entries in the SalesInfo table that meet the "where" condition. Then it processes all new entries inserted into the SalesInfo table as they are added to the table. The next portion of this document will describe the data structures and procedural mechanisms used to in a preferred embodiment to perform (i.e., execute) a streaming query.

FIGS. 9A, 9B, 9C and 9D show a set of data structures used to keep track of the status of the various table access operators running on a node of a database management system (DBMS). These data structures include file control blocks 140, transaction control blocks 142, session control blocks 144, a DeltaScan waiters list 260, and various scheduler queues 270, 272.

In the context of the present discussion, a file is a table partition. When a table is not partitioned, the entire table is stored in a single file. For each file there is a file control block 140, which contains a file identifier 202, and a list of session control blocks 204. Each session control block identified in the list 204 represents a table access operator that is accessing the file. A session control block represents the execution of one leaf node of an execution tree.

As discussed above with respect to FIG. 5, the execution of a SQL statement can include execution of a transaction, or a sequence of transactions. While a transaction associated with a statement is active, the statement may access multiple files, which may be on one or more nodes of the system. When discussing transactions, it is often convenient to say that a transaction accesses various files to denote the access operations done on behalf of the transaction, even though file access is actually being handled by the leaf node operators of a statement. For ease of discussion, this terminology will be used here.

When a statement is executed in the context of a transaction, there is a distinct transaction control block 142 (FIG. 9B) for that transaction on each node of the system for which the statement has a table access operator. The transaction control block 142 includes a transaction identifier field 212 and a list 214 of files affected by the identified transaction. The list 214 consists of a list of file identifiers 216, which are implemented as file numbers in an exemplary embodiment.

Figure 9A:
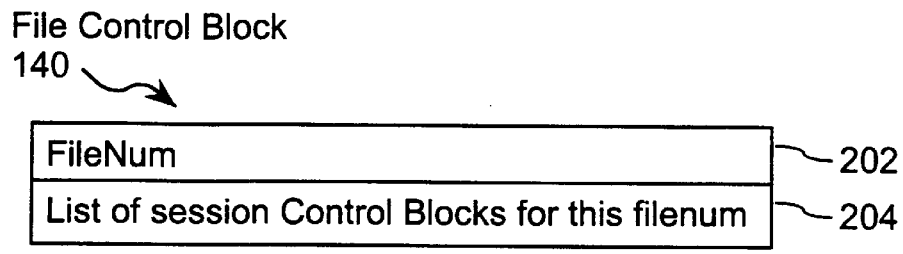
FIGS. 9A, 9B, 9C, 9D, 9E and 9F represent control blocks, lists and queues used by the SQL executor to control and keep track of the status of table access operators being executed by a disk process.
Figure 9B:
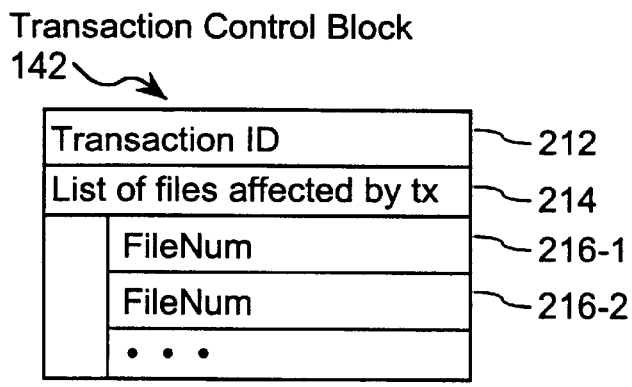
Figure 9D:
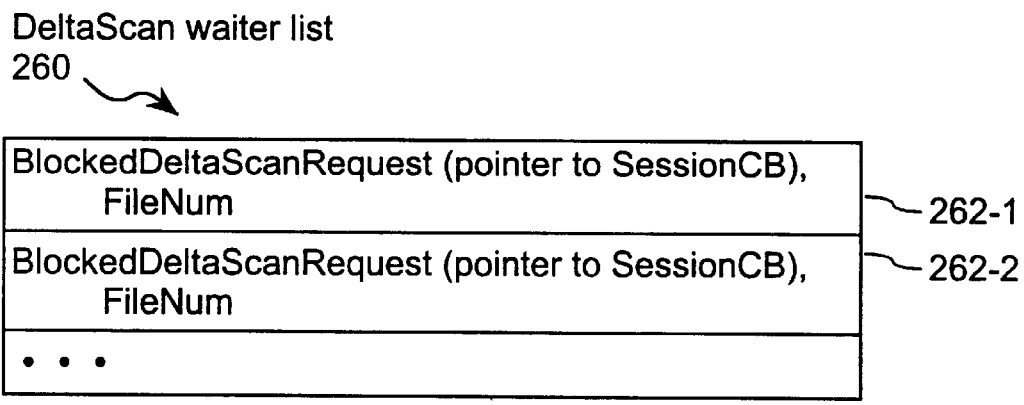
Figure 9E:
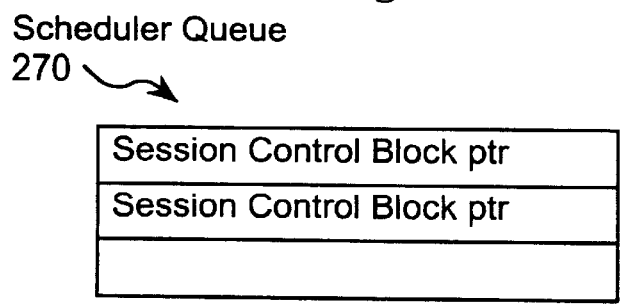
Figure 9C:
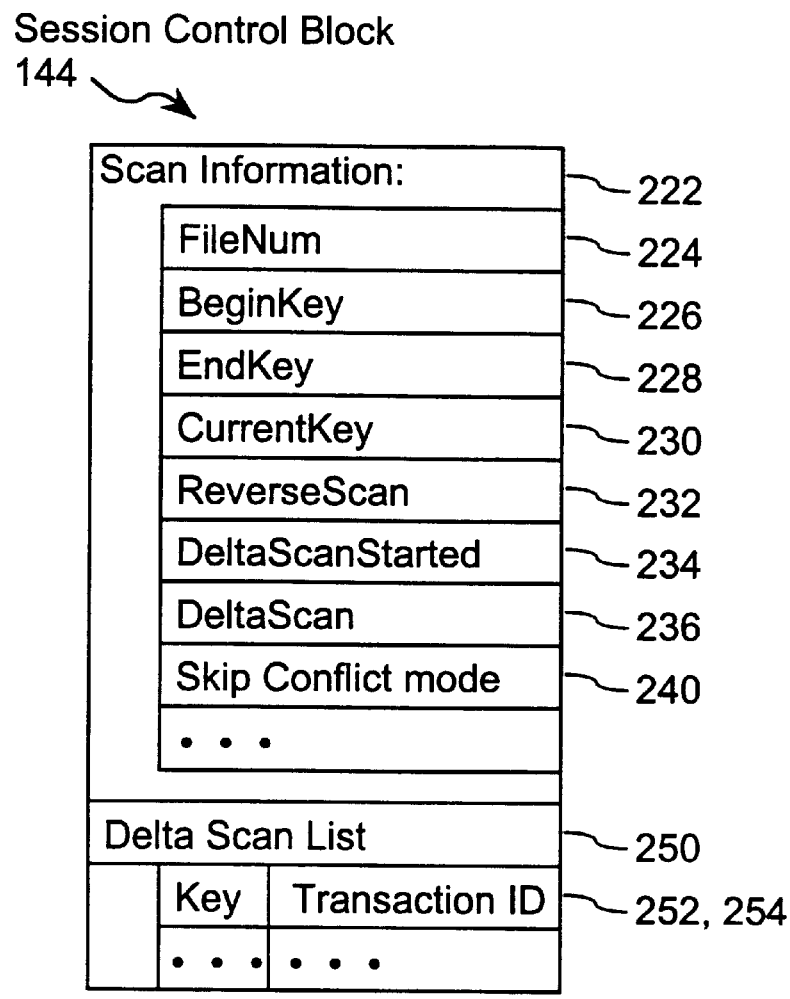

For each table access operator (i.e., active leaf node), there is a session control block 144 (FIG. 9C). The session control block 144 includes scan information 222 about the status of a scan, as well as a delta scan list 250 that identifies table rows to be processed after the conclusion of a regular scan. It should be noted that the session control block 144 is a particular type of task control block 170 (FIG. 8), and thus contains the same type of header information (171, 173, 174, 175) shown in FIG. 8, but not repeated here in FIG. 9C. The definition block pointer 171 of each session control block points to the definition block (which may include compiled code) that is executed by the table access operator corresponding to the session control block.

The scan information portion of the session control block includes the following fields:
- a filenum 224, which identifies the file (table partition) accessed by the table access operator;
- a BeginKey 226 and EndKey 228, which together specify a range of records to be scanned by the table access operator;
- a CurrentKey 230, which represents the key value of the record currently being accessed by the table access operator;
- a ReverseScan flag 232, which indicates whether the file is being scanned by the table access operator in reverse index order;
- a DeltaScanStarted flag 234, which indicates whether the table access operator has already accessed all data in the defined range, and is now in streaming mode;
- a DeltaScan flag 236, which indicates whether or not streaming mode is enabled for the table access operator; and
- a Skip Conflict mode flag 240, which indicates how the table access operator is to respond when it attempts to access a record locked in a conflicting mode.

Delta scan list 250 identifies table rows that the table access operator needs to process at a later time. Each entry in the delta scan list 250 includes a key 252 and a transaction identifier 254. The key is the index value of row that has been modified by the identified transaction. For instance, a table access operator may modify a row by inserting the row in the table, or by updating the contents of the row.

The DeltaScan waiter list 260 (FIG. 9D) is a list of session control blocks for table access operators that are performing delta scans, but whose progress has been blocked by pending transactions, or more generally by a lack of available qualifying tuples to process. Each item 262 in the list 260 includes a pointer to a session control block. Optionally, each item 262 may also include the file number for the session control block referenced by that item, for ease of reference when determining which table access operators on the DeltaScan waiter list are eligible for resuming execution.

Scheduler queue 270 (FIG. 9E) is a list of session control blocks for table access operators that are performing delta scans and have been rescheduled for execution because a blocking transaction has committed its results to durable storage. Each such table access operator is identified in the list 270 by a pointer to the corresponding session control block.

Figure 9F:
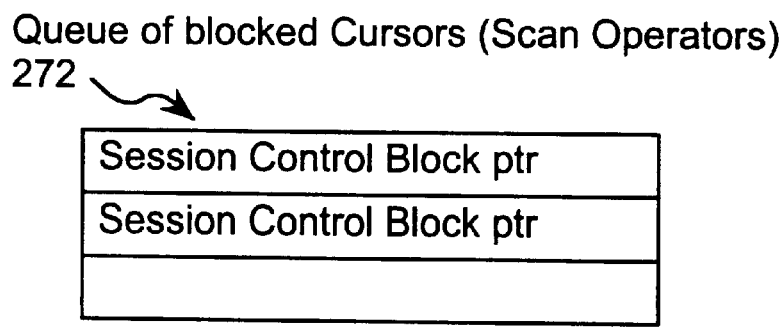

Scheduler queue 272 (FIG. 9F) is a list of session control blocks for table access operators whose progress has been blocked, usually by a locked row in a conflicting mode (e.g., by a row for which there is write lock held by another transaction), or whose execution has otherwise been temporarily halted, but which will need to be rescheduled for execution in the future.

The scheduler may also contain numerous other lists and data structures that are not directly relevant to the present discussion, but which are nevertheless essential to its operation. Since these data structures are well known to those skilled in the art of designing SQL execution engines, they will be mentioned only to the extent they are relevant to explanation of the preferred embodiments of the present invention.

To best understand these data structures, their use will be explained with respect to the execution of a set of transactions.

Scan Operator Procedure with Streaming Mode

First, we will assume that one or more streaming mode queries are being performed, and that their transaction control blocks and session control blocks have been established and kept up-to-date. However, it should be noted that a session control block 220 is used for all table access operators, not just those in streaming mode. Further, some of the mode flags, such as the ReverseScan and Skip Conflict mode flags are applicable even when a non-streaming mode scan is being performed.

The application level programs that initiate streaming queries may use commands such as "publish" and "subscribe" to insert or update data into a stream of data, and to receive the data in that stream, respectively. The publish command is converted by the application into an ordinary SQL insert or update command, which is then compiled and executed by the transaction processing system.

Figure 10A:
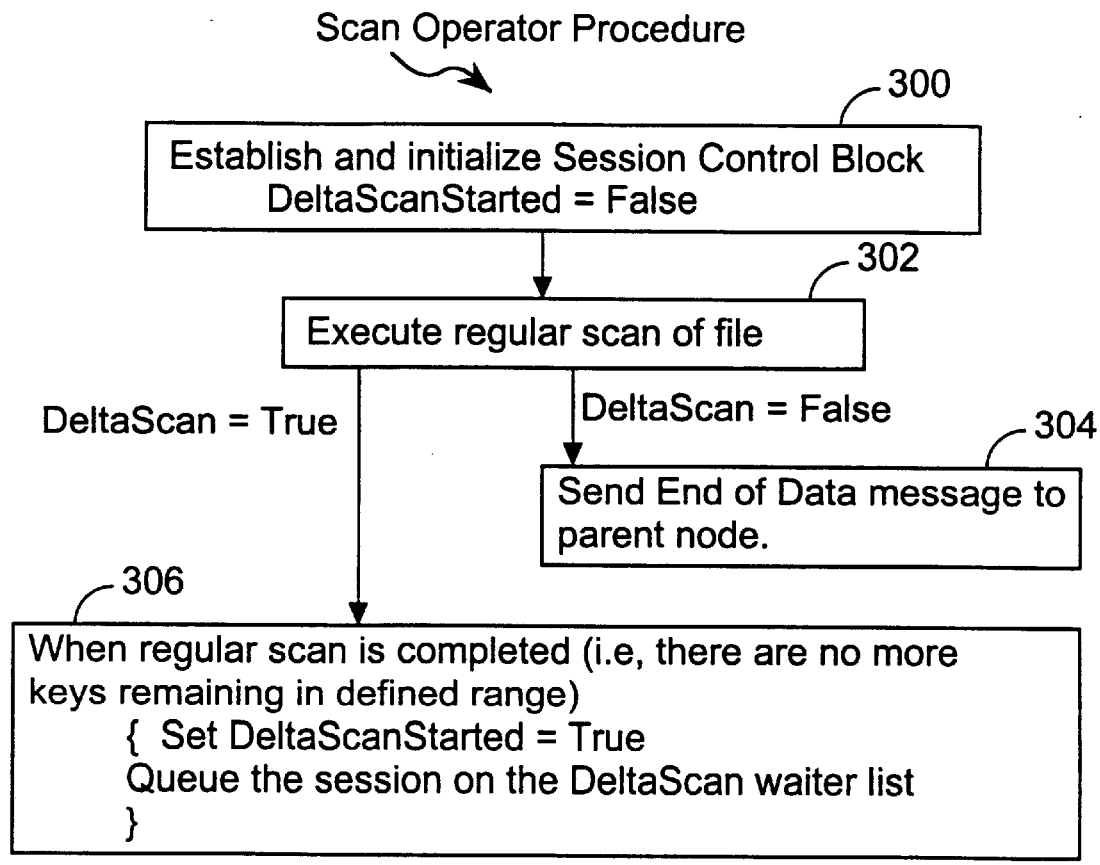
FIGS. 10A and 10B depict flow charts of a table scan procedure and a delta scan procedure, respectively.

Referring to FIG. 10A, the scan operator procedure starts by establishing and initializing a session control block for a table access operator (300). All the fields of the session control block shown in FIG. 9C are initialized. The DeltaScanStarted field is always initialized to a value of "False" because each table access operator begins with a regular scan, and only performs a delta scan (also called a secondary scan) after the regular scan is completed.

Next, the scan operator procedure performs a regular scan of the identified table (302). Various details of this step will be explained below. However, the basic aspects of a regular scan are as follows. The scan starts at the begin or end of the range, depending on whether a reverse scan is being performed, and proceeds through the table until either a locked row is encountered, or the end of the scan range is reached. A row may be locked (in a conflicting mode) when it is in use by a concurrent transaction other than the transaction associated with the current table access operator. For instance, a transaction may lock a row to ensure that the values in the row do not change until the transaction completes, or because the contents of the row have been modified but not yet committed. In any case, the scan operator procedure halts when it reaches a locked row, unless the Skip Conflict flag 240 (FIG. 9C) is set, in which case the procedure skips that row and continues processing with the next row. More details of the Skip Conflict mode of operation are discussed below.

When a table access operator is blocked by a locked row, the associated scan is temporarily halted and the request is added to a queue 270 (FIG. 9F) of blocked table access operators. The scheduler for the disk process automatically attempts to restart blocked table access operators when transactions commit or abort. When restarted, the table access operator resumes work at the row where it was last blocked.

If the DeltaScan mode flag is set to False, indicating that the table access operator is not performing a streaming mode scan, the scan operator procedure sends an end of data message (304) to the parent node in the execution tree when the table access operator reaches the end of the scan range.

If the DeltaScan mode flag is set to True, the scan operator procedure switches to DeltaScan mode when the table access operator reaches the end of the scan range (306). In particular, it sets the DeltaScanStarted flag in the session control block to True, and queues the session on the DeltaScan waiter list.

Figure 10B:
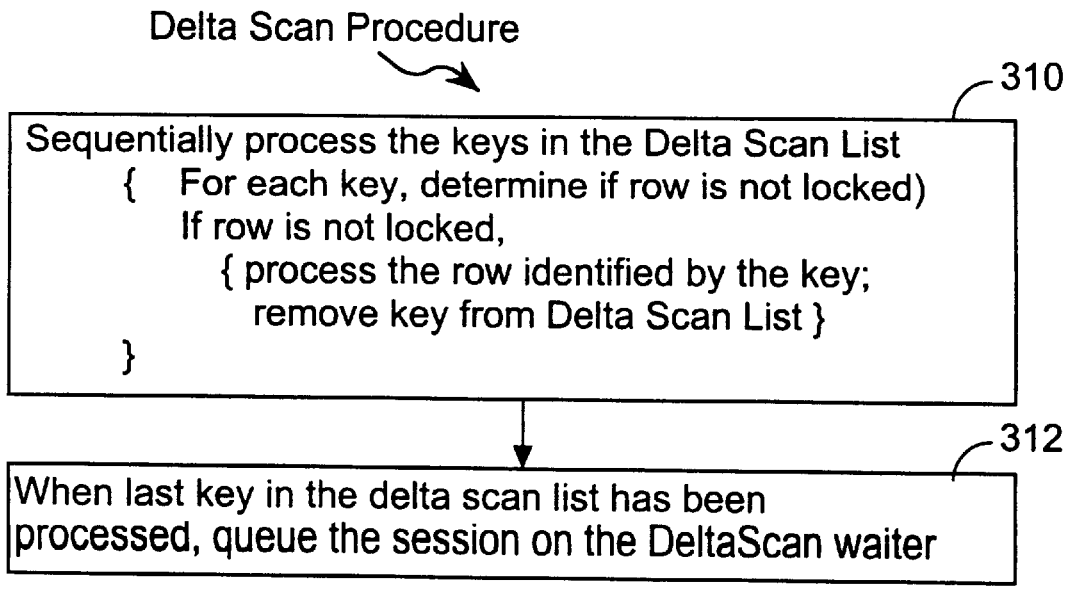

Referring to FIG. 10B, the delta scan procedure is executed when a table access operator has finished its "regular scan" of the specified range of rows. The delta scan procedure processes any additional rows of data that are ready for processing, and then "goes to sleep" on the DeltaScan waiters list until more rows of data are ready for processing. Each time the delta scan procedure is executed for a table access operator, the procedure attempts to process the rows referenced in the delta scan list 250 (FIG. 9C) in the session control block for that table access operator. For each referenced row that is not locked, the row is processed and the corresponding key is removed from the delta scan list (310).

When all the unlocked rows identified by the delta scan list have been processed, the session is put back on the DeltaScan waiters list (312).

The result sets created by stream mode table access operators of the present invention can be joined with the result sets of other table access operators, which enables efficient data processing. Basically, the result set returned by any leaf node, including a streaming mode leaf node, can be processed by higher level nodes of the execution tree. Thus, for example, a higher level node in the execution tree can perform a join operation on the result sets received from two or more leaf nodes. Further, the SQL compiler can optimize the execution of such join operations using existing compiler techniques and infrastructure. However, any node operator that would normally require an "end of data" from a lower node is modified so as operate on streams (i.e., without receiving an end of data).

Transaction Update, Insert, Commit and Abort Procedures

As discussed above, unlocked, committed rows in the delta scan list of a table access operator need to be processed by the operator's delta scan. Below is an explanation of how updates and inserts performed by concurrent transactions are captured in delta scan lists, and how transaction terminations (which cause locks to be released) make those rows available for processing and also cause delta scans to be rescheduled for processing the newly available rows.

Figure 11:
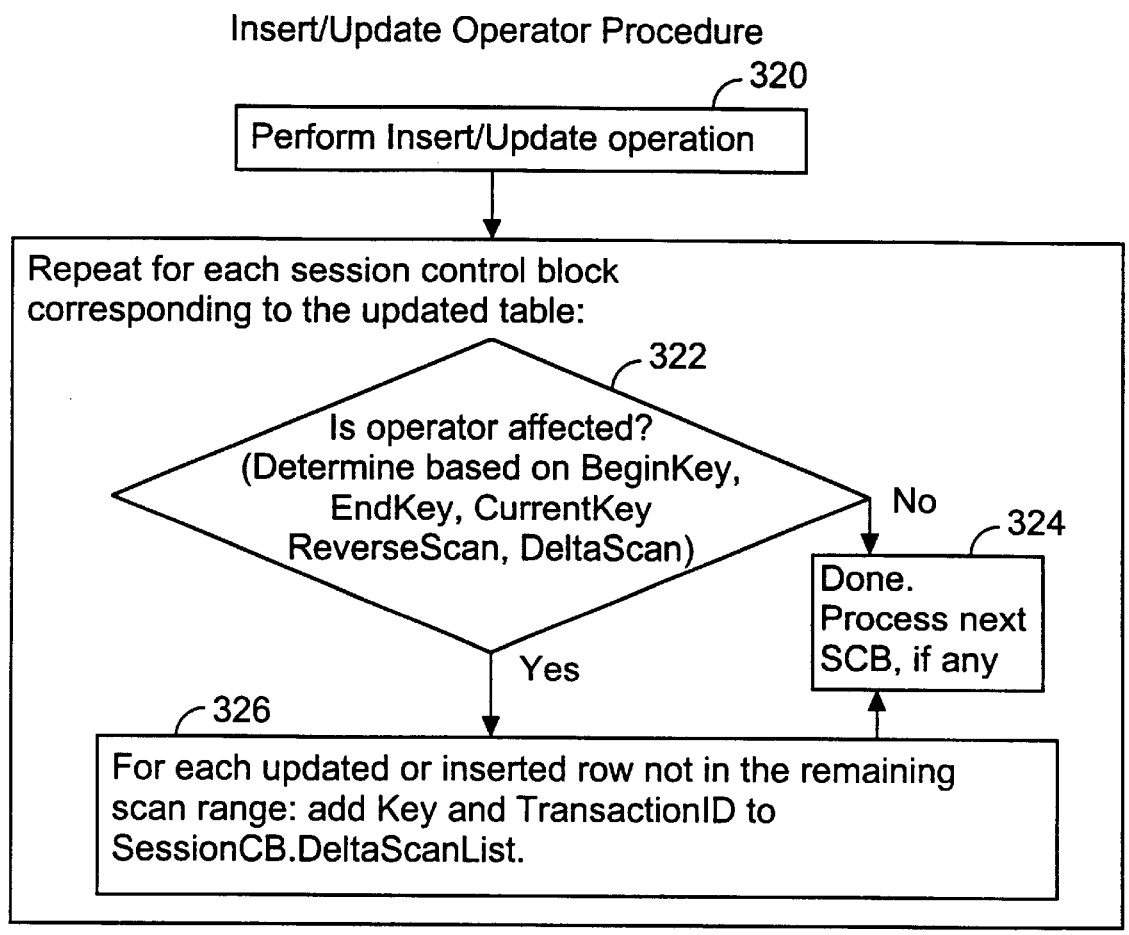
FIG. 11 is a flow chart of an insert/update operation procedure executed by a disk process for a table access (scan) operator.

Referring to FIG. 11, whenever an update or insert operation is performed, the corresponding disk file is updated (320). However, if the update operation is being executed in the context of a transaction, the updates to the file are not permanent until the transaction commits and therefore the updated or inserted rows are locked to prevent other table access operators from using the information in these rows.

Next, the insert and update operator procedure repeats the following steps (322, 324, 326) for each session control block listed in the file control block for the file whose contents were updated. First, the procedure determines if the operator for that session control block is affected by the table update (322). This determination is made by comparing the key(s) for the updated row(s) with (A) the full range of keys for the operator, and (B) with the remaining scan range for the table access operator. The remaining scan range is determined by inspecting the BeginKey, EndKey, CurrentKey and ReverseScan fields of the session control block to determine a remaining scan range (i.e., a range of key values).

If all the updated or inserted rows are either outside the range of keys for the table access operator, or are in the remaining scan range, the operator is not affected because either the operator does not need to process the updated or inserted rows, or it will do so automatically as the operator's scan progresses. If the table access operator is in streaming mode, and any of the rows that are updated or inserted are in the range of keys for the session but outside the remaining scan range, then the table access operator is affected because the operator will need to go back during the delta scan phase of its scan and process the updated or inserted rows. Similarly, if the table access operator is already in the delta scan phase, the operator is affected if any of the updated or inserted rows are in the key range for the operator.

If the table access operator is not affected (320-No), the insert and update operator procedure processes the next session control block, if any, listed in the file control block (324). If the table access operator is affected (320-Yes), the key(s) of all the updated or inserted rows that can affect the table access operator are added to the delta scan list of the operator's session control block (326). Stated more simply, for each updated or inserted row that is not in the remaining scan range, but is in the range of keys for the table access operator, the key and transaction ID are added to the delta scan list of the session control block. As indicated, the transaction ID for the transaction that updated or inserted those rows is stored along with each key added to the delta scan list.

Figure 12:
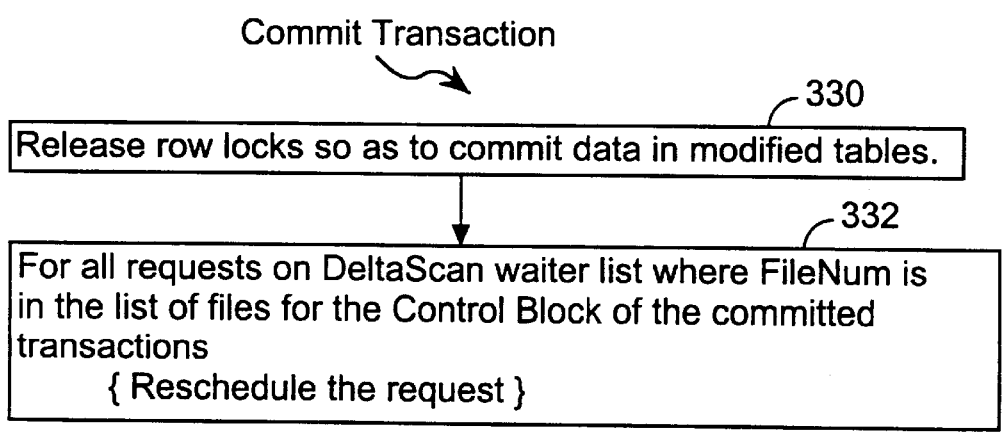
FIG. 12 is a flow chart of a portion of a procedure performed when a transaction commits.

Referring to FIG. 12, when a transaction commits, the transaction releases the row locks on the rows that the transaction has updated or inserted (330). By releasing the row locks, the changes to the database are committed and made available to other transactions. When a transaction commits and the row locks have been released, the scheduler receives a list of files that have been updated. It then inspects the DeltaScan waiters list and reschedules all requests (i.e., table access operators) in the list which correspond to the files in that list (332). Typically, pointers to the session control blocks for the rescheduled requests are added to a queue of requests for which further processing will resume when the scheduler is able to allocate resources to them.

As a result, table access operators in delta scan mode that have stalled due to a lack of available, qualifying rows are automatically rescheduled for execution whenever a transaction that may affect the availability of qualifying rows terminates.

Figure 13:
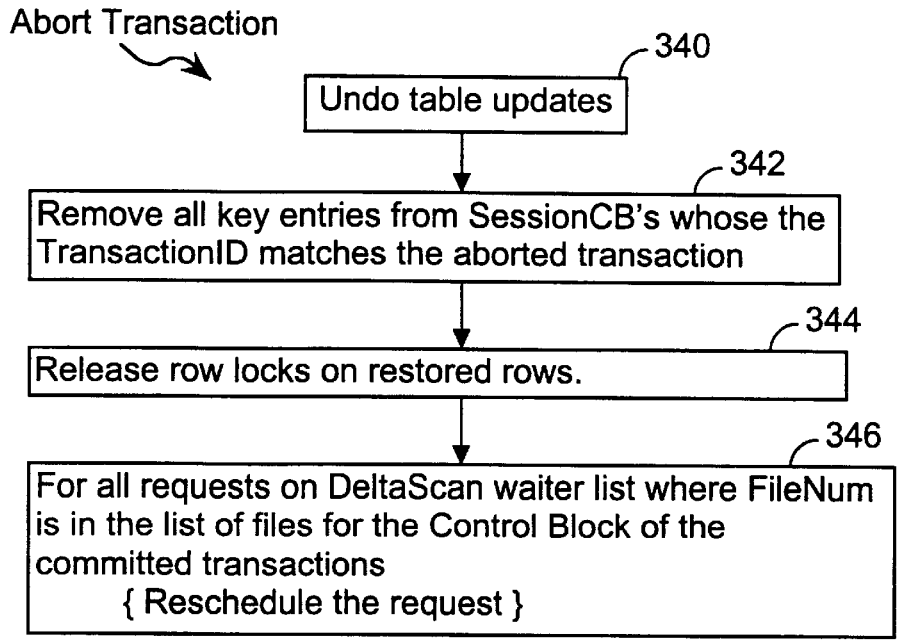
FIG. 13 is a flow chart of a portion of an abort transaction process performed by a disk process procedure for a table access (scan) operator.

Referring to FIG. 13, when a transaction aborts, the transaction (i.e., the corresponding table access operators) rolls back (undoes) the table updates made by the transaction (340). In addition, for each file affected by the aborted transaction (as indicated by the file numbers listed in the transaction's control block), the corresponding table access operator inspects the lists of keys for all corresponding session control blocks (as indicated by the session control blocks listed in the file control blocks) and deletes all key entries whose transaction ID matches the ID of the aborted transaction (342). In this way, table access operators in streaming mode will not attempt to process rows that were updated or inserted by aborted transactions. The aborted transaction releases the row locks held by the transaction (344). It then inspects the DeltaScan waiters list and reschedules all requests (i.e., table access operators) in the list which correspond to the files in that list (346). Rescheduling those requests is necessary because (A) the aborted transaction may have held locks that blocked the progress of other table access operators, and (B) the aborted transaction may modify tuples through use of the set of rollback features, described below.

Skip Conflict Mode of Operation

A "skip conflict" mode of operation is provided to enable a table access operator to process rows not locked in a conflicting mode, without being blocked by rows that are locked in a conflicting mode (i.e., locked in a mode that prevents access to the rows by the operator). The skip conflict mode of operation is useful when processing records quickly is important, but the order in which records are processed is not important. Further, the skip conflict mode of operation is useful in conjunction with update and delete operations embedded in select statements, which will be discussed in more detail below.

The skip conflict mode of operation differs from traditional "browse" access. Browse access allows a transaction to read tuples on which another transaction has a lock in an incompatible mode. For instance, even though the other transaction might have a write lock on a tuple, a transaction with browse access is allowed to read the tuple. Since the data read using browse access may be internally inconsistent, any application using browse access must have appropriate safeguards to handle such internally inconsistent data. The skip conflict mode of operation differs from browse access in that skip conflict causes the table access operator to skip over tuples locked in an incompatible mode, while browse access causes the operator to return tuple uncommitted values even when the tuples are locked in an incompatible mode by another transaction. In addition skip conflict mode, when used in conjunction with streaming access mode, keeps track of the skipped tuples so that they can be accessed during the delta scan, after the locks on the skipped tuples have been released.

The preferred extended SQL syntax for using the skip conflict mode of operation is:

select * from table where . . . for skip conflict access

Figure 14:
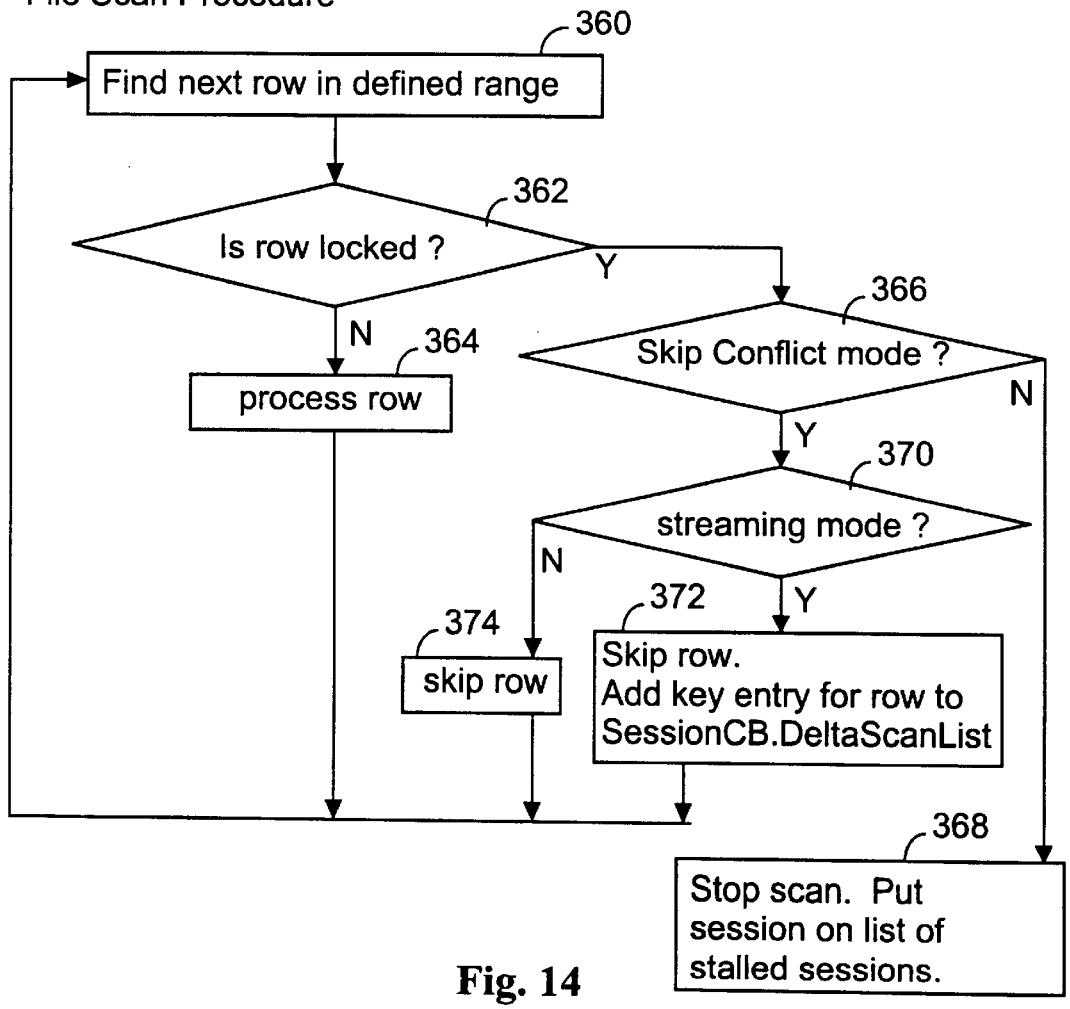
FIG. 14 is a flow chart of a file scan procedure having logic for handling Skip Conflict mode and streaming access file scans.

Referring to FIG. 14, the file scan procedure shown is for performing a regular scan of a file, and corresponds generally to step 302 of FIG. 10A. Note that the file scan procedure shown here does not include features of the invention which will be introduced later in this document. When first started, or after processing a row, the file scan procedure finds a next row, if any, in the defined range of rows (360). Refer to FIG. 10A and the above discussion of that figure for what happens when there are no more rows in the defined range.

The scan procedure determines if the row is locked by another transaction (362) in a conflicting mode. If the row is not locked in a conflicting mode, the row is processed (364) and the scan procedure then searches for a next row to process (360). However, if the next row found by the procedure is locked in a conflicting mode (362-Y), what happens next depends on the mode of operation of the scan operator. If the scan operator's session is not in "Skip Conflict" mode (366), the scan operator halts when it reaches a locked row (368). When a table access operator is halted by a locked row, the operator's session is added to a lock waiting queue, which is usually a different queue from the queue 270 (FIG. 9F) of blocked scan operators.

If the scan operator's session is in "Skip Conflict" mode (as indicated by the Skip Conflict flag 240 in FIG. 9C) (366), and the session is also in streaming mode (370), then the scan operator skips that row (372) and continues processing with the next row in the delta scan list. In addition, it adds a key entry to the delta scan list in the session control block for the skipped row. The key entry enables the scan operator to process the skipped row after its row lock has been released.

If the scan operator's session is in "Skip Conflict" mode (as indicated by the Skip Conflict flag 240 in FIG. 9C) (366), and the session is not in streaming mode (370), then the scan operator skips that row (374) and continues processing with the next row. Since the scan operator is not in streaming mode, the delta scan list is not used for this scan operator, and no entry is made in the delta scan list for the session control block.

The Skip Conflict mode of operation will be further discussed below in conjunction with the delete operations.

Streaming Access to Partitioned Tables

An important aspect of Compaq/Tandem transaction processing systems is that they are fault tolerant and scalable. Transparent horizontal partitioning of large database tables is used to scale and distribute computational loads across the nodes and devices in a cluster. "Horizontal partitioning" means that a table is divided or partitioned into two or more files, with each partition storing the records (tuples) having a corresponding range of key values. For example, each of two or more partitions of a customer table might be used for records corresponding to customer names starting with corresponding range of letters A–L. Tables can also be partitioned based on a hash value. For example, using a hash function of a record index can have any of N (e.g., 4) values, a table can be divided into N partitions, with the hash function being used to determine the partition in which each table row is stored. Further, each partition may be stored on a different node of the system to facilitate distribution of the computational load on the system.

The present invention extends the horizontal partitioning of database tables to queue and publication channels, and uses partitioning for data dependent routing and load distribution. Thus, the present invention enables the use of horizontally partitioned queues and publication channels. This is best explained by example.

Figure 15:
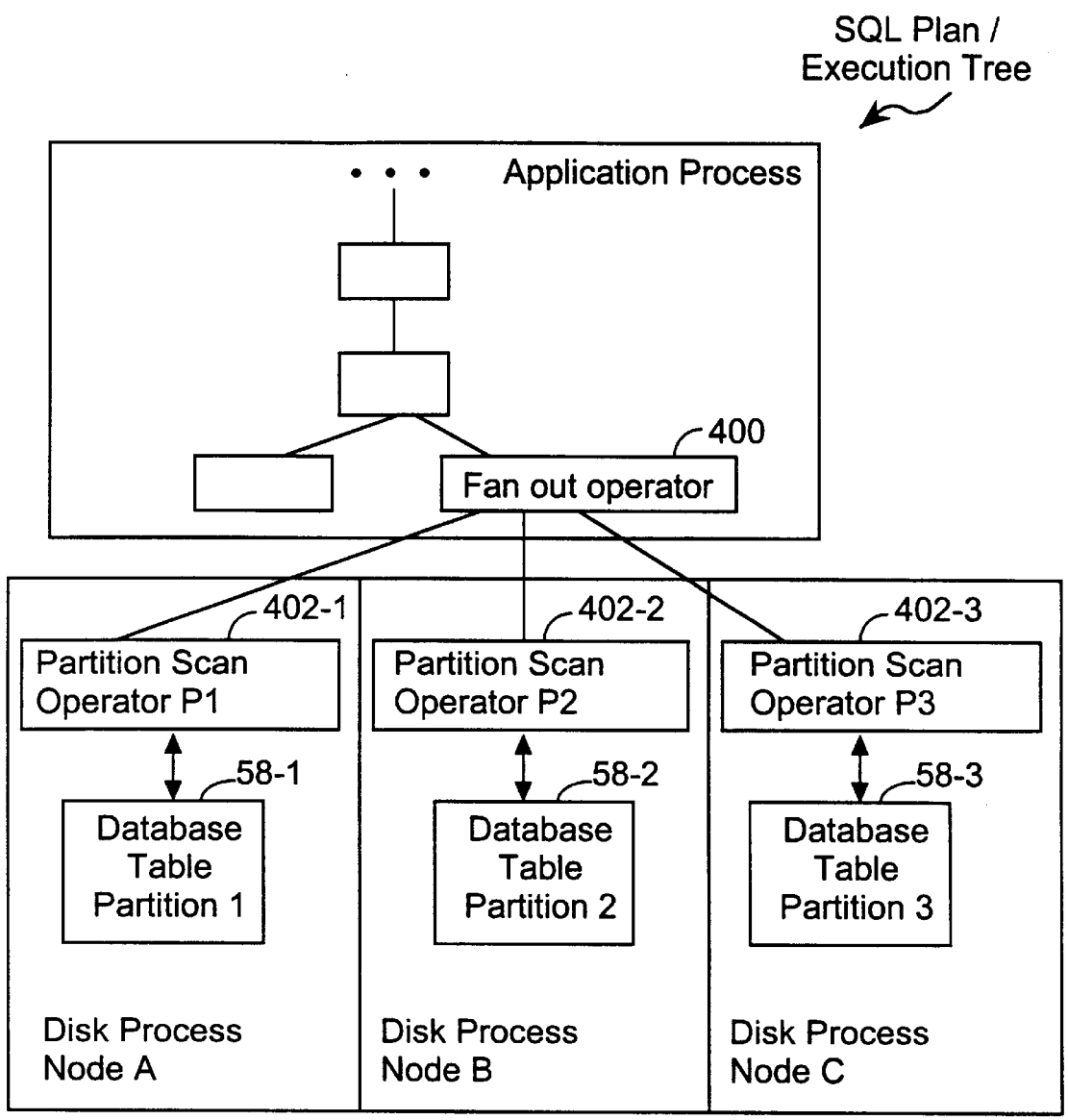
FIG. 15 depicts the use of a fan out operator node in a query execution tree for automatically routing requests for tuples to the partition access (scan) operators handling the various different partitions of a table.

Referring to FIG. 15, when a leaf node of an execution tree corresponds to a partitioned table, the leaf node scan operator is replaced by a fan out operator 400 that is coupled to a partition scan operator 402 for each of the table partitions. During the first phase of a streaming mode scan, sometimes called the regular scan phase, the function of the fan out operator 400 is quite simple. It directs data requests to the partition scan operator for each of the table partitions. The order in which such requests are directed to the partition scan operators may vary from one implementation to another, and relates to aspects of database management systems not relevant to the present invention.

When all the partitions have completed the regular scan phase, the fan out operator sends additional requests to the partition scan operators in accordance with the type of scan being performed. The fan out operator can have more than one outstanding request pending at a time. Nowaited asynchronous operations are used for this purpose.

It is noted that in one embodiment the fan out operator does not keep track of the scan phase (initial scan or delta scan) of its partition scan operators. Furthermore, the fan out operator does not attempt to retrieve rows from the partitioned table in any particular order. However, as a practical matter, initial scans by the partition scan operators will usually complete before many rows are retrieved from delta scans, because the partition scan operators in the delta scan phase will typically be suspended much of the time for lack of qualifying tuples, allowing the initial scans by the other partition scan operators to complete.

In another embodiment the fan out operator includes a larger status table for keeping track of the key ranges associated with each partition scan operator, and more detailed status information about each partition scan operator so as to be able to return rows to the calling application in a specified order. In this embodiment, the fan out operator extracts tuples from the partition scan operators in a order specified by the calling application during the initial scan.

The partition scan operators support five types of requests from the fan out operator. One of these request types is used for non-streaming, read only access to a database, while a second request type is used for streaming, read only access. These two request types are defined as follows:

1) Request Type 1: requests the partition scan operator to return all rows that satisfy the table access operator, and further requests that the partition scan operator not block if there isn't a row to return. In other words, when there are no rows to return, the partition scan operator returns a null set of rows to the fan out operator and does not wait for any further rows to be added to the partition. This type of request is typically used for non-streaming, read only access to a database table partition. The fan out operator sends this request to each table partition, and receives in response all records that satisfy the cursor. The request is non-blocking because the fan out operator does not want or need to receive records added to the table partition after the request is made.
2) Request Type 2: requests the partition scan operator to return all rows, but blocks if there isn't one. This type of request is used for streaming, read only access (i.e., for streaming operators that do not delete or update tuples). This type of request is sent by the fan out operator to all of the partition scan operators so as to automatically retrieve rows as they are inserted or updated in the table. Since this request type is used only for streaming access, this request type never returns an "end of data" indicator.

Three additional types of request types are needed primarily for embedded delete or embedded update access to database tuples, which is discussed below. These request types are defined as follows:

3) Request type 3: requests the partition scan operator to return one row that satisfies the cursor, and further requests that if there isn't a row to return the partition scan operator should block (i.e., wait) until a row satisfying the cursor is inserted into the table, or until such a row in the table is updated. In other words, the partition scan operator resumes execution once further rows become available. In a second implementation, this request type is used to request at least one, but no more than N, rows, where N is a parameter specified by the application fetching data from the table. This request type is used for streaming, delete access and update access queries on non-partitioned tables, or if only a single partition is accessed by a query.
4) Request type 4: requests the partition scan operator to return one row that satisfies the cursor, and further requests that if there isn't a row to return the partition scan operator should not block, but rather should return a null value. In a second implementation, this request type is used to request at least one, but no more than N, rows, where N is a parameter specified by the application fetching data from the table. This request type is used for streaming, delete access and update access queries on partitioned tables. It is also used for non-streaming, delete access and update access scans on both partitioned and non-partitioned tables.
5) Request type 5: requests the partition scan operator to return a value indicating whether or not the partition scan operator has at least one row that satisfies the cursor, and further requests that if there isn't a row that satisfies the cursor, the partition scan operator should wait until a row satisfying the cursor is inserted into the table, or until such a row in the table is updated. This request type is used for streaming, delete access and update access scans on partitioned tables.

Embedded Delete and Update Statements with Result Sets

Normally, using prior art database systems, in order to update a tuple and then return it to a calling application (or to return a tuple to an application and then update it) requires two separate operations, an update operation followed by a select operation (or vice versa). Similarly, using prior art database systems, to both return a tuple to a calling application and delete the same tuple, requires two separate operations, a select followed by a delete operation. Using the present invention, delete or update operations can be embedded in a select statement, and thus can be performed in a single combined operation, which is much more efficient.

In a preferred embodiment of the present invention, delete and update statements are considered to be "embedded" in a select statement when a delete or update keyword is embedded in the "from" clause of a select statement, for example:

select * from (delete from table) as t;

A key issue concerning delete and update operations is to guarantee that transactions do not commit before all rows actually deleted or updated have been returned to the calling application. To avoid deleting or updating rows that are not returned to the calling application, the SQL executor provides an interface that allows the application to specify how many rows are to be updated or deleted per fetch operation by the application. For instance, the five request types used by the partition scan operator and the fan out operator described in the previous section of this document enable the SQL executor to guarantee that all updated and deleted rows are returned to the calling application when the table that is being accessed is a partitioned table.

The delete and update features of the present invention provide a destructive read capability and a "read modify write" capability in conjunction with streaming access to a database table. This allows queuing services to be provided by a relational database system while preserving the ability of the DBMS to perform other relational operators on the result set returned. Further, these features are useful in that they allow an application to combine delete, update and read operations into a single SQL statement, which reduces the cost of performing certain transactions.

Destructive reads are sometimes used to ensure that an item is processed exactly once. For instance, several "credit evaluation" processes might be assigned the job of reading and processing credit applications. Each such process could use a destructive read (i.e., delete operation with result set) to read a next credit application record for processing. In this way, the credit evaluation processes work in parallel, without interfering with each other while ensuring that each credit application is processed once and only once.

Destructive read capabilities are provided by some relational database systems. However, such systems generally do not provide destructive read capabilities in conjunction with streams (i.e., notifications of newly received records). To provide similar functionality in such systems, the application program must submit and resubmit a query to the system on a periodic basis so as to process newly inserted and updated table entries.

In the preferred embodiment, only authorized users are granted delete or update access to database tables. An SQL access privilege module 148 (FIG. 5) is used to store information about which users have delete or update access to specific tables, and to block delete or update access by unauthorized users.

At the application level, the destructive read function may be called "dequeuing" data from a queue. Thus, a dequeue statement in an application program is converted into a select query that uses the stream, skip conflict and embedded delete features of the present invention. That query is then submitted to the database system for compilation and execution.

An example of an SQL statement that would read and delete only those tuples which are not currently read, updated, inserted or deleted by another concurrent transaction is as follows:

select * from (delete from t for skip conflict access) as t;

An example of a query that updates tuples not in use by another concurrent transactions is as follows:

select * from (update t set dequeued="true" where dequeued<>"true" for skip conflict access) as t;

The following are two examples of queries that use an ordinary database table as a transactional queue from which records are dequeued:

select * from (delete from stream(t) for skip conflict access) as t;

and select * from (update stream(t) set dequeued="true" where dequeued<>"true" for skip conflict access) as t;

As indicated, the keyword "stream" in the query is used to continuously dequeue items from a table, thereby creating a continuous stream of result tuples.

When returning deleted and updated rows to the application, the SQL execution engine ensures that the transaction will not commit until all deleted or updated tuples have been retrieved by the application. This can be achieved by returning control to the application only after all selected rows have been returned. Alternately, the calling application can be given an explicit notification indicating that the fetch pipeline is empty, in which case any request to commit the transaction is rejected while the pipeline is not empty. Other methodologies might be used in alternate embodiments of the invention. These techniques are used to prevent the application from committing the transaction while rows are "in transit," i.e., still in the fetch buffers 72 (FIG. 4) between the scan operator and the application. The transaction commit causes the effects of the delete or update operations to be made permanent. A subsequent application crash would cause the updated or deleted rows to be lost, as they have been permanently updated or removed from the database by the committed transaction, but never delivered to the application.

Also the result sets created by the delete and update access operations of the present invention can be joined with the result sets of other table access operators, which enables efficient data processing through the use of delete and/or update operations embedded in a query.

Furthermore, the ability to skip locked tuples, using the skip conflict access feature of the present invention, in combination with embedded delete and update operations facilitates implementation of efficient transactional dequeuing operations.

The application level enqueuing operations, which generate or submit the tuples to be processed by dequeuing operations, are translated into standard SQL insert and update statements, respectively.

Another example of a dequeuing operation that helps to demonstrate both the new SQL syntax of the preferred embodiment and the usefulness of a combination of the stream, delete and skip conflict features is as follows. A credit check transaction may need to access a customer record. To implusement this, a select statement for continuously dequeuing orders may be nested within a select statement joining customer records with orders, as follows:

select * from customer, (delete from stream(order) for skip conflict access) order where order.customer#=customer.customer#;

In the above example the statement, during execution, will skip all order entries that are locked by another transaction in a conflicting mode.

Other examples of select statements with embedded update operations are as follows. The syntax "return new.fieldlist" is used in the from clause of a select statement to indicate the updated field values that are to be returned to the calling application, while the syntax "return old.fieldlist" is used in the from clause of a select statement to indicate the before update field values that are to be returned to the calling application. In a preferred embodiment, the return of the updated tuple is implied.

Two equivalent select statements that return updated tuple values to the calling application are:

select * from (update account set balance=balance+:credit return new.*) as account;

and select * from (update account set balance=balance+:credit) as account;

where ":credit" indicates a value provided by the calling application.

A select statement that returns both the before and after tuple values is:

select * from (update account set balance=balance+credit return new.*, old.*) as account;

A select statement that returns a specific updated tuple field value is:

select * from (update account set balance=balance+:credit return new.balance) as account;

A select statement that returns a specific tuple field before update value is:

select * from (update account set balance=balance+:credit return old.balance) as account;

A select statement that returns a specific tuple field before and after update is:

select * from (update account set balance=balance+credit return new.balance, old.balance) as account;

The return clauses such as "return old.*" shown above can also be used with select statements having embedded delete operations.

The tuple fields returned by a select statement are defined in the definition blocks for the nodes of the execution tree. The definition blocks for leaf nodes specify both an update or delete operation and a set of tuple fields to be returned when the compiled statement is a select statement having an embedded delete or update operation.

Suppressing Pre-fetching

Referring to FIG. 4, the request queue 70 and a fetched records queue 72 may be used by the transaction processing system to pre-fetch records not yet requested by the application that submitted the query being processed. For instance, each node in the execution tree other than the leaf nodes may be automatically configured to request as many records as can be stored in the fetched records queue(s) 72 between it and its child or children nodes, even if such records have not yet been requested by the application. Pre-fetching can improve system performance, by making use of otherwise dormant system resources, and can improve system responsiveness by having data ready for the application before it requests it.

However, unbound pre-fetching must be suppressed when executing an embedded delete or update statement. The application must control how many rows are to be affected by the delete or update operation, and therefore the database management system must only delete or update those records actually requested by the application. This is achieved by the protocol described by example below.

Figure 16:
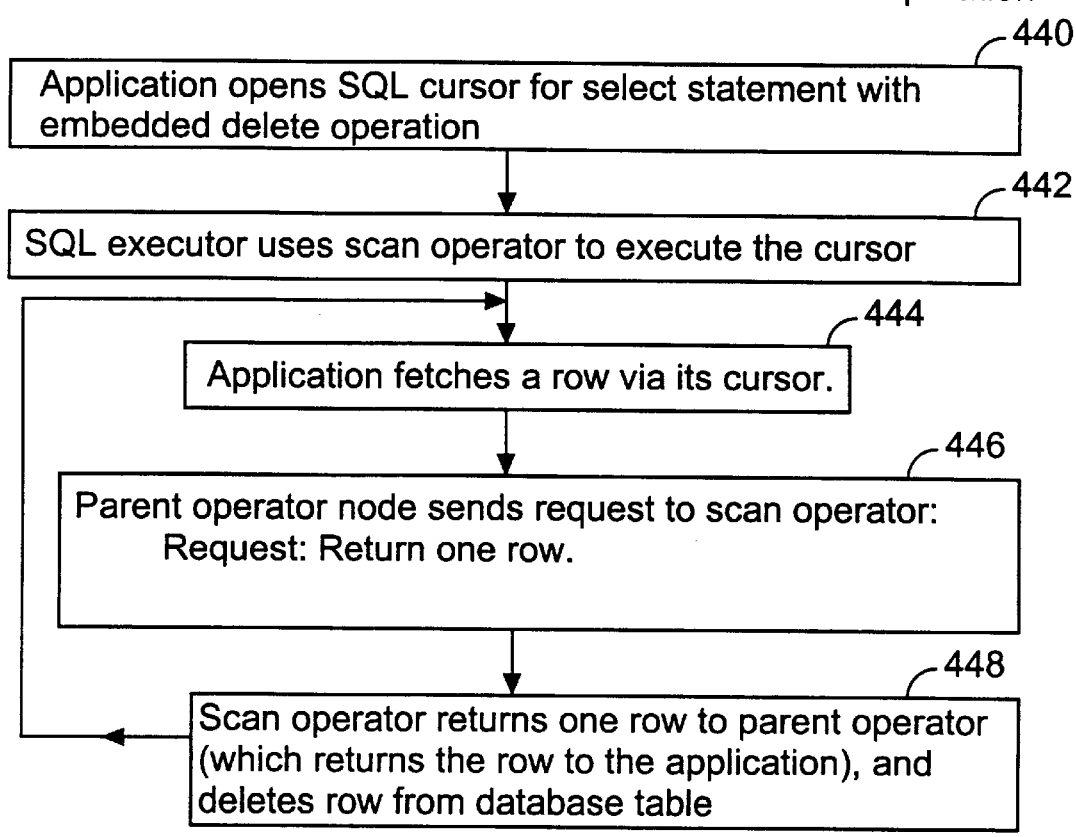
FIG. 16 is a flow chart for executing a stream access scan with an embedded delete operation on a non-partitioned table.

Example of Execution of Select Statement with Embedded Delete, for Non-Partitioned Table Referring to FIG. 16, when an application requests a dequeuing operation on a non-partitioned table, the dequeuing operation is expressed as an SQL select statement using the "delete from t" syntax, described above. After compilation of the SQL statement, execution begins by the application process "opening an SQL cursor" on the specified table to be destructively read (440). Opening a cursor activates the execution tree and primes the SQL executor for fetching data from the specified table. The SQL executor uses the leaf node scan operator for the specified table to execute the cursor (442). When the application fetches a row using its cursor (444), the fetch is passed to the operator node in the execution tree that is the parent of the scan operator (446). That operator node sends a request (of Request Type 4) to the scan operator, requesting the return of one row. See the description above, for Request Type 4.

The scan operator returns one row to its parent node, for processing by the application, and deletes that row from the database table (448). The process then repeats when the application fetches another row (444).

If the select statement uses stream access mode, the parent node will use Request Type 3(see description, above) at step 446 to request the scan operator to block (i.e., wait) if there isn't a row in the table satisfying the cursor until such time that a qualifying row appears (i.e., is inserted) in the table.

Figure 17A:
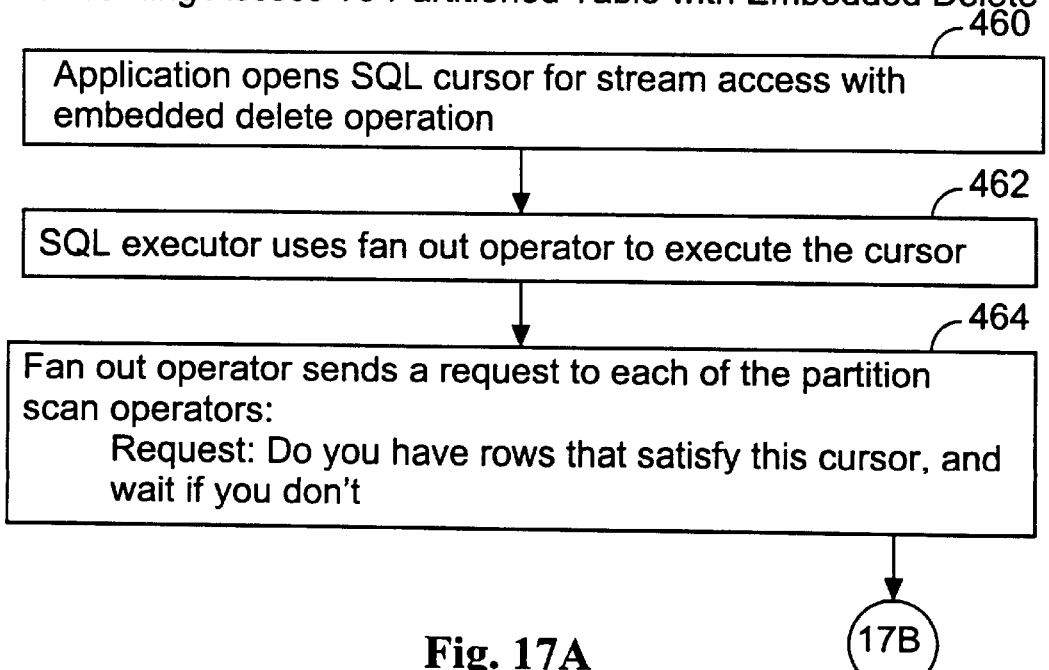
FIGS. 17A and 17B are a flow chart for executing a stream access scan with an embedded delete operation on a partitioned table.
Figure 17B:
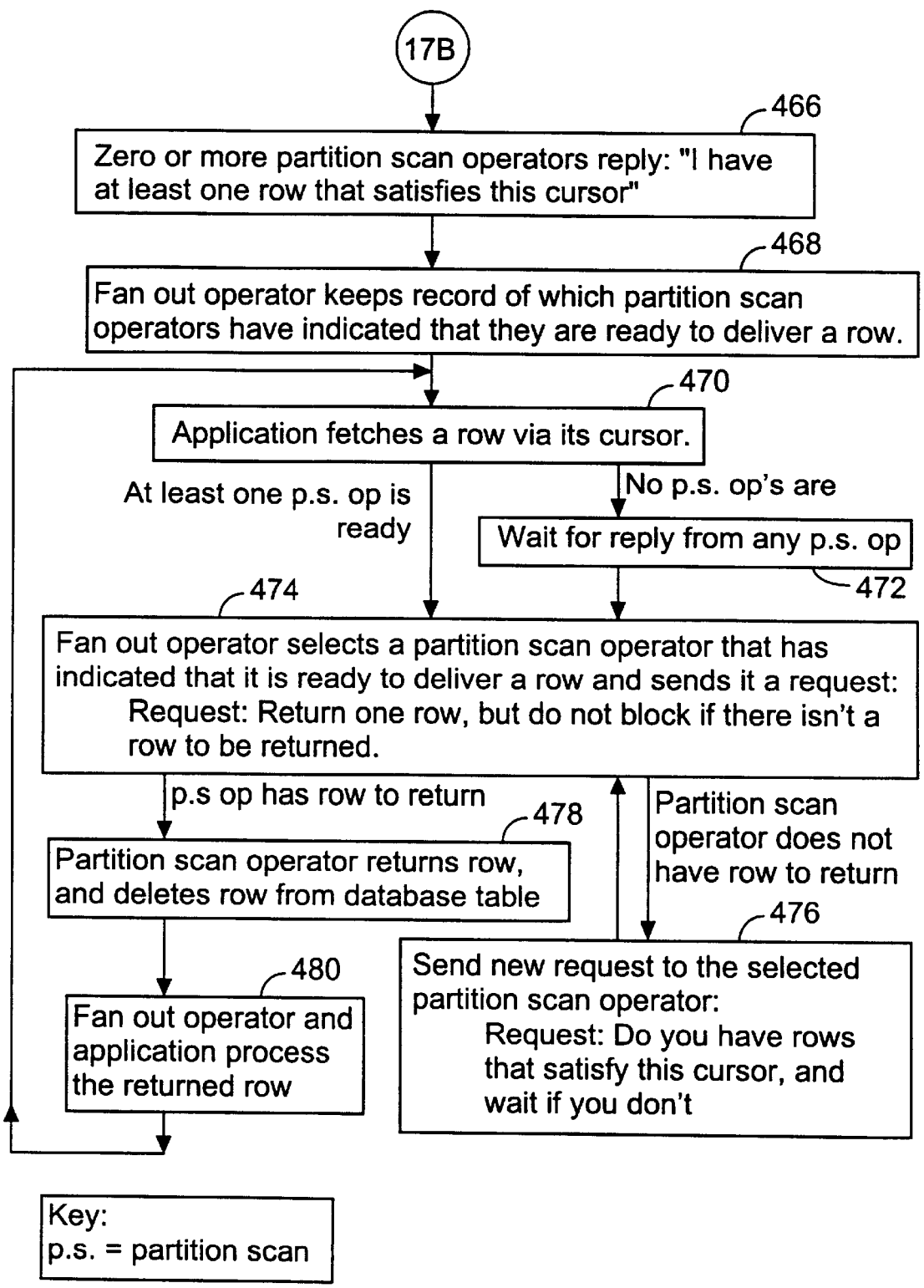

Example of Execution of Select Statement with Embedded Delete and Stream Access for Partitioned Table Referring to FIGS. 15, 17A and 17B, when a destructive read is applied to a partitioned table, a fan out operator node is generated by the SQL executor to coordinate the row fetches by the partition scan operators.

After compilation of the SQL statement with an embedded delete, execution begins by the application process "opening an SQL cursor" on the specified table (460). The SQL executor uses the fan out operator for the specified table to execute the cursor (462). Before the application fetches a row (470), the fan out operator "primes" the execution tree by sending a request of type 5 to each of the partition scan operators for the specified table. This request asks the partition scan operators to send a reply to the fan out operator when the partition scan operator has at least one row that satisfies the cursor (464). Each partition scan operator that does not have any rows satisfying the cursor blocks until such time that it does have at least one row that satisfies the cursor.

The fan out operator receives zero or more reply messages from the partition scan operators, each reply indicating that a respective partition scan operator has at least one row that satisfies the cursor (466). The fan out operator keeps a record of which partition scan operators have indicated that they are ready to return a row (468). Note that a partition scan operator may indicate at step 466 that it has a row satisfying the cursor, but that an instant later that row may be deleted by another scan operator working on behalf of another application. Thus, such replies by partition scan operators are remembered, but not relied on by the fan out operator.

When the application fetches a row using its cursor (470), the fan out operator determines if any partition scan operators have indicated that they are ready to return a row. If not, the fan out operator continues to wait for a reply from any of the partition scan operators (472). Once such a reply is received, or if such a reply had been received prior to the fetch by the application, the fan out operator selects a partition scan operator that has indicated that it is ready to return a row. Any number of procedures might be used to make this selection. For instance, while the scan is in regular scan mode, the selection criteria might be to select the scan operator for the lowest index value portion of the table, and while the scan is in the delta scan mode the selection criteria might be a round robin selection criteria. The fan out operator sends a request to the selected partition scan operator, requesting it to return one row that satisfies the cursor, and to return a null value if there isn't a row to be returned (474). This is a non-blocking request, since the partition scan operator is being requested to return a reply right away, the reply consisting of either a single row or a null reply.

If the selected partition scan operator does not have a row to return, the fan out operator sends another request to the selected partition scan operator. This request asks the partition scan operator to send a reply to the fan out operator when the partition scan operator has at least one row that satisfies the cursor (476). In this way the fan out operator will automatically receive a notification whenever the partition scan operator has at least one row that satisfies the cursor. Then the fan out operator returns to step 474 to select a partition scan operator from which to request a row.

If the selected partition scan operator does have a row to return, the selected partition scan operator returns one row (478) to the fan out operator for processing by the application (480), and deletes that row from the database table (478). At this point, the fan out operator assumes that the selected partition scan operator has at least one more row that satisfies the cursor, and continues operation at step 470. The above described fan-out process then repeats when the application fetches another row (470).

In other implementations, the application may fetch multiple rows (e.g., N rows) at a time. In those implementations, the fan out operator at step 474 will request the selected partition scan operator to send "up to N" rows. At step 478 the partition scan operator will return anywhere from 1 to N rows, depending on how many rows it currently has that are ready for delivery to the requesting application.

Setting Column Values Upon Transaction Abort

Traditionally, when a transaction aborts, all changes to the database made by the transaction are undone, and the database is returned to a state that is indistinguishable from the transaction having never taken place. When there is a need to document or record the reason for aborting a transaction, the conventional method of handling this requirement is to return an abort reason code to the application program that started the transaction. However, when using transactional queues, client processes do not directly communicate with their servers. An abort of the server's transaction will just re-instantiate the request in the queue, causing another server to process the request anew. If the reason leading to the abort is not transient, any subsequent transaction will also abort.

The Set on Rollback feature of the present invention enables the relational database facility to, for example, count the number of times an attempt has been made to dequeue and process a request. In particular, an SQL language extension has been made to change column values on abort. The language extension is the clause:

set on rollback {column value change specification}.

For example, a statement to dequeue orders from a table named "order" having the fields order#, customer# and aborts would be:

select * from (delete from stream(order) set on rollback aborts= aborts+1 for skip conflict access) as order;

The "set on rollback" clause in the above example counts how often an attempt has been made to dequeue an entry.

To implement the "set on rollback" feature, the SQL compiler is extended to accept "set on rollback" syntax and to generate item expressions for updating the "before image" of a column. The SQL compiler rejects any update on columns (i.e., within a set on rollback clause) that have dependencies such as constraints, triggers and indices that would require further actions that could not be executed at abort time. The compiler also rejects any update that may change the size of a column value, since that would interfere with physical (i.e., page level) recovery operations. Therefore updates to VARCHAR fields (in a "set on rollback" clause) are not supported.

Figure 18:
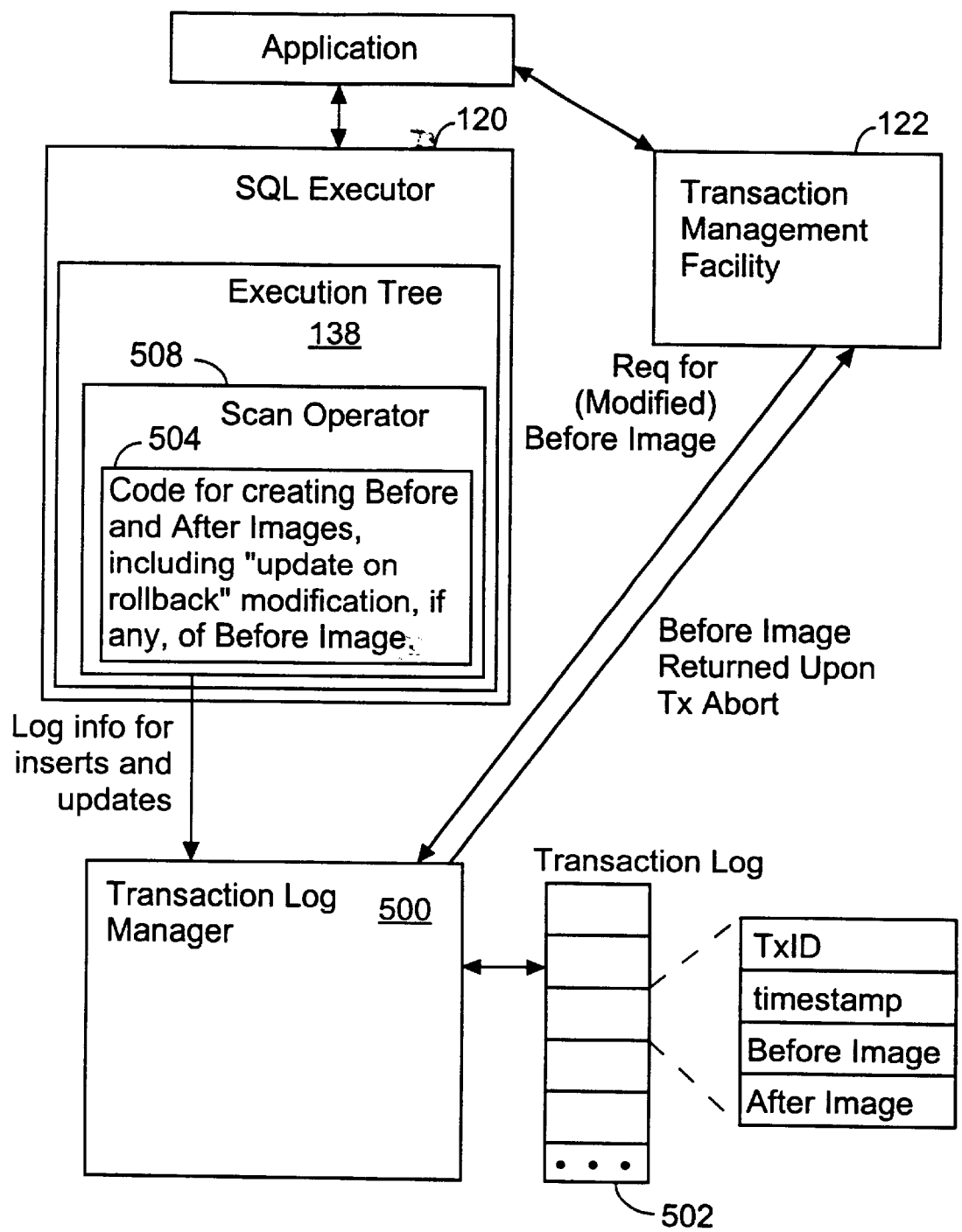
FIG. 18 depicts a transaction log manager that has been modified to support a "set on rollback" SQL syntax extension.

Referring to FIG. 18, the "set on rollback" is performed by modifying the before image of a column, before it is passed to the transaction log manager 500 for storage in the transaction log. More specifically, SQL compiler includes in the code 508 for any update, delete or insert operator (generically herein called a table access operator) code 510 for generating a before and after image for each modified and new tuple. In the enhanced SQL compiler of the present invention the image generation code 510 includes code for updating one or more fields of the Before Image when the query being compiled includes a "set on rollback" clause that affects the table being accessed by this operator 508.

When the Before and After Images are passed by the table access operator 508 to the transaction log manager 500, the Before Image contains one or more modified fields if the query being executed contained a corresponding "set on rollback" clause. The Before and After Images are stored by the transaction log manager 500 in a transaction log 502.

In fact, the transaction log manager 500 maintains a log 502 of every database record (row) update, insert and delete made by any transaction. Each entry in the log 502 includes a transaction ID, for identifying the transaction that modified the database table, a timestamp, a "before image" of the database record prior to the update, and an "after image" of the record after the update. Other information may also be stored in the transaction log that is not relevant to the present discussion.

If a transaction using a query is aborted, the transaction management facility 122 restores to the relevant database table the Before Image for each tuple updated or deleted by the transaction. If the query used by the transaction included a "set on rollback" clause affecting that table, the Before Image that is restored will include one or more modified fields.

In order to properly support streaming scan mode, "set on rollback" operations that modify the before image of a tuple are treated as update operations. More specifically, when modifying the before image of a tuple, the key for the tuple is inserted into the delta-scan key list of any scan operators affected by the tuple update, using the same procedure as the one discussed above with reference to FIG. 11. The inserted keys are removed from the delta-scan key lists when the transaction commits, but are retained if the transaction aborts. Thus, in FIG. 12, a step is added to the commit transaction procedure for removing keys from key lists for tuples that were updated only by a "set on rollback" clause. For tuples updated by a standard set clause in an SQL statement, executed within the context of the transaction that is committing, the corresponding keys are retained in any key lists in which they were inserted.

Alternate Embodiments

The present invention can be implemented as a computer program product that includes a computer program mechanism embedded in a computer readable storage medium. For instance, the computer program product could contain the program modules shown in FIG. 5. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of processing a stream of data in a database management system, in accordance with a specified query, comprising:
    using a scan operator, performing an initial scan to access a defined range of rows in the database table;
    while performing the initial scan, building a list of rows that are added to the database table during the initial scan and that are to be accessed by the scan operator after the initial scan;
    using the scan operator, performing a secondary scan to access rows in the list, including accessing the rows in the list that are not locked;
    while performing the secondary scan, adding to the list of rows additional rows added to the database table after the initial scan; and
    processing the accessed rows in accordance with the specified query.

2. The method of claim 1,
    during the secondary scan,
        removing from the list each unlocked row accessed by the scan operator during the secondary scan; and
        suspending operation of the secondary scan when all unlocked rows in the list have been accessed.

3. The method of claim 2,
    when a locked row in the database table is unlocked by a terminating transaction, scheduling the secondary scan to resume operation.

4. The method of claim 2,
    when a transaction that has added rows to the database table aborts, removing from the list the rows that were added to the table.

5. The method of claim 2, further including
    deleting each unlocked row accessed by the scan operator.

6. The method of claim 1, further including
    storing for the scan operator at least one data structure having fields for storing information indicating: a range of rows to be accessed by the scan operator, whether the scan operator is performing an initial scan, whether the scan operator is performing a secondary scan;
    the at least one data structure including the list of rows.

7. The method of claim 1, wherein when the query specifies that any rows of the database table locked in conflicting modes are to be skipped, each conflicting mode preventing the scan operator from accessing the locked rows, the method includes:
    while performing the initial scan:
        skipping over the rows, if any, locked in the conflicting modes; and
        adding to the list of rows the locked rows skipped during the initial scan.

8. A database management system, comprising:
    a database, including a plurality of tables, each table storing data in one or more rows;
    an execution engine for executing a streaming mode query, for processing a stream of data, the execution engine including a scan operator for accessing a defined range of rows in a specified one of the database tables;
    the scan operator including:
        initial scan instructions for performing an initial scan to access the defined range of rows in the specified table;
        a list data structure for storing a list of references to rows in the specified table that are to be accessed by the scan operator after the initial scan, the list of references including references to rows, if any, added to the specified table during the initial scan; and
        secondary scan instructions for performing a secondary scan to access rows referenced in the list data structure.

9. The database management system of claim 8, wherein the list data structure further storing references to additional rows, if any, added to the database table after the initial scan.

10. The database management system of claim 8, wherein the secondary scan instructions include instructions for:
    removing from the list the reference to each unlocked row accessed by the scan operator during the secondary scan; and
    suspending operation of the secondary scan when all unlocked rows in the list have been accessed.

11. The database management system of claim 10, further including:
    a scan scheduling module that, when a locked row in the database table is unlocked, schedules the secondary scan to resume operation.

12. The database management system of claim 10, further including:
    a transaction abort module that removes from the list data structure references to rows updated by an aborted transaction.

13. The database management system of claim 10, further including:
    the scan operator including row delete instructions for deleting each unlocked row accessed by the scan operator.

14. The database management system of claim 8, further including:
    a session block data structure for the scan operator, the session block data structure having fields for storing information indicating: a range of rows to be accessed by the scan operator, whether the scan operator is performing an initial scan, and whether the scan operator is performing a secondary scan.

15. The database management system of claim 8, wherein when the query specifies that any rows of the database table locked in conflicting modes are to be skipped, the conflicting modes preventing the scan operator from accessing the locked rows, the initial scan instructions include instructions for:
    skipping over the rows, if any, locked in the conflicting modes;
    adding to the list references to the locked rows skipped during the initial scan.

16. A computer program product for use in conjunction with a computer system, the computer system including a database, including a plurality of tables, each table storing data in one or more rows; the computer program product comprising a computer readable storage medium and a computer program mechanism embedded therein, the computer program mechanism comprising:

an execution engine for executing a streaming mode query, for processing a stream of data, the execution engine including a scan operator for accessing a defined range of rows in a specified one of the database tables;

the scan operator including:
- initial scan instructions for performing an initial scan to access the defined range of rows in the specified table;
- a list data structure for storing a list of references to rows in the specified table that are to be accessed by the scan operator after the initial scan, the list of references including references to rows, if any, added to the specified table during the initial scan; and
- secondary scan instructions for performing a secondary scan to access rows referenced in the list data structure.

17. The computer program product of claim 16, wherein the list data structure further storing references to additional rows, if any, added to the database table after the initial scan.

18. The computer program product of claim 16, the secondary scan instructions including instructions for:
- removing from the list the reference to each unlocked row accessed by the scan operator during the secondary scan; and
- suspending operation of the secondary scan when all unlocked rows referenced by the list have been accessed.

19. The computer program product of claim 18, further including:
a scan scheduling module that, when a locked row in the database table is unlocked, schedules the secondary scan to resume operation.

20. The computer program product of claim 18, further including:
a transaction abort module that removes from the list data structure references to rows updated by an aborted transaction.

21. The computer program product of claim 18, further including:
the scan operator including row delete instructions for deleting each unlocked row accessed by the scan operator.

22. The computer program product of claim 16, further including:
a session block data structure for the scan operator, the session block data structure having fields for storing information indicating: a range of rows to be accessed by the scan operator, whether the scan operator is performing an initial scan, and whether the scan operator is performing a secondary scan.

23. The computer program product of claim 16, wherein when the query specifies that any rows of the database table locked in conflicting modes are to be skipped, the conflicting modes preventing the scan operator from accessing the locked rows, the initial scan instructions include instructions for:
- skipping over the rows, if any, locked in the conflicting modes;
- adding to the list references to the locked rows skipped during the initial scan.

24. A database management system, comprising:
a database, including a plurality of tables, each table storing data in one or more rows;
an execution engine for executing a streaming mode query, for processing a stream of data, the execution engine including a scan operator for accessing a defined range of rows in a specified one of the database tables;

the scan operator including:
- instructions for scanning a defined range of rows in a database table in accordance with the specified query, and returning qualifying rows in the defined range to a calling application; and
- instructions for suspending operation of the scan operator when there are no qualifying rows in the defined range; and the execution engine including instructions for automatically resuming operation of the scan operator when one or more qualifying rows in the defined range are added to the database table.

25. The database management system of claim 24, wherein the instructions for suspending operation of the scan operator including instructions for suspending operation of the scan operator when the scan operator encounters a row in the database table that is locked in a mode that conflicts with a data access mode associated with the scan operator.

26. The database management system of claim 24, wherein the instructions for resuming operation of the scan operator including instructions for automatically resuming operation of the scan operator when a transaction holding at least one lock on a row in the database table terminates.

27. The database management system of claim 24, wherein the scan operator includes instructions for:
- performing an initial scan to access the defined range of rows in the database table;
- while performing the initial scan, building a list of rows that are added to the database table during the initial scan and that are to be accessed after the initial scan;
- performing a secondary scan to access rows in the list, including accessing the rows in the list that are not locked;
- while performing the secondary scan, adding to the list of rows additional rows added to the database table after the initial scan; and
- processing the accessed rows in accordance with the specified query.

28. The database management system of claim 24, wherein when the query specifies that any rows of the database table locked in conflicting modes are to be skipped, the conflicting modes preventing the scan operator from accessing the locked rows, the scanning instructions of the scan operator include instructions for skipping over the rows, if any, locked in the conflicting modes.

29. The database management system of claim 28, wherein when the query does not specify that any rows of the database table locked in the conflicting modes are to be skipped, the suspending step includes suspending operation of the scanning step when the scanning step encounters a row in the database table that is locked in any conflicting mode that conflicts with a data access mode associated with the scanning step.

30. A computer program product for use in conjunction with a computer system, the computer system including a database, including a plurality of tables, each table storing data in one or more rows; the computer program product comprising a computer readable storage medium and a computer program mechanism embedded therein, the computer program mechanism comprising:
an execution engine for executing a streaming mode query, for processing a stream of data, the execution engine including a scan operator for accessing a defined range of rows in a specified one of the database tables;

the scan operator including:
- instructions for scanning a defined range of rows in a database table in accordance with the specified query, and returning qualifying rows in the defined range to a calling application; and
- instructions for suspending operation of the scan operator when there are no qualifying rows in the defined range; and the execution engine including instructions for automatically resuming operation of the scan operator when one or more qualifying rows in the defined range are added to the database table.

31. The computer program product of claim 30, wherein the instructions for suspending operation of the scan operator including instructions for suspending operation of the scan operator when the scan operator encounters a row in the database table that is locked in a mode that conflicts with a data access mode associated with the scan operator.

32. The computer program product of claim 31, wherein the instructions for resuming operation of the scan operator including instructions for automatically resuming operation of the scan operator when a transaction holding at least one lock on a row in the database table terminates.

33. The computer program product of claim 30, wherein the instructions for resuming operation of the scan operator including instructions for automatically resuming operation of the scan operator when a transaction holding at least one lock on a row in the database table terminates.

34. The computer program product of claim 30, wherein the scan operator includes instructions for:
- performing an initial scan to access the defined range of rows in the database table;
- while performing the initial scan, building a list of rows that are added to the database table during the initial scan and that are to be accessed after the initial scan;
- performing a secondary scan to access rows in the list, including accessing the rows in the list that are not locked;
- while performing the secondary scan, adding to the list of rows additional rows added to the database table after the initial scan; and
- processing the accessed rows in accordance with the specified query.

35. The computer program product of claim 30, wherein when the query specifies any rows of the database table locked in conflicting modes are to be skipped, the conflicting modes preventing the scan operator from accessing the locked rows, the scanning instructions of the scan operator include instructions for skipping over the rows, if any, locked in the conflicting modes.

36. The computer program product of claim 35, wherein when the query does not specify that any rows of the database table locked in the conflicting modes are to be skipped, the suspending step includes suspending operation of the scanning step when the scanning step encounters a row in the database table that is locked in any conflicting mode that conflicts with a data access mode associated with the scanning step.

* * * * *